United States Patent
Yokota

(10) Patent No.: US 8,848,131 B2
(45) Date of Patent: Sep. 30, 2014

(54) LIGHTING DEVICE, DISPLAY DEVICE AND TELEVISION RECEIVER

(75) Inventor: Masashi Yokota, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 326 days.

(21) Appl. No.: 13/375,817

(22) PCT Filed: Apr. 6, 2010

(86) PCT No.: PCT/JP2010/056205
§ 371 (c)(1),
(2), (4) Date: Dec. 2, 2011

(87) PCT Pub. No.: WO2010/146914
PCT Pub. Date: Dec. 23, 2010

(65) Prior Publication Data
US 2012/0081634 A1 Apr. 5, 2012

(30) Foreign Application Priority Data
Jun. 15, 2009 (JP) ................................. 2009-142187

(51) Int. Cl.
*G02F 1/13357* (2006.01)
*G02F 1/1335* (2006.01)
*G02F 1/1333* (2006.01)

(52) U.S. Cl.
CPC .... *G02F 1/133603* (2013.01); *G02F 2201/465* (2013.01); *G02F 1/133608* (2013.01); *G02F 2001/133314* (2013.01)
USPC ........................................... 349/61; 362/97.3

(58) Field of Classification Search
None
See application file for complete search history.

(56) References Cited

U.S. PATENT DOCUMENTS

| 8,648,979 | B2 * | 2/2014 | Kuromizu ........................ 349/58 |
| 2006/0103776 | A1 * | 5/2006 | Park ................................. 349/58 |
| 2006/0187660 | A1 * | 8/2006 | Liu ................................. 362/294 |
| 2007/0121318 | A1 * | 5/2007 | Nanbu ........................... 362/228 |
| 2008/0106897 | A1 * | 5/2008 | Yoon et al. ..................... 362/235 |
| 2009/0141208 | A1 * | 6/2009 | Byoun et al. .................... 349/58 |
| 2009/0154139 | A1 * | 6/2009 | Shin ............................. 362/97.1 |
| 2010/0008066 | A1 * | 1/2010 | Moro et al. .................. 362/97.1 |
| 2011/0285923 | A1 | 11/2011 | Yokota |
| 2012/0044668 | A1 * | 2/2012 | Takeuchi ..................... 362/97.1 |

FOREIGN PATENT DOCUMENTS

| CN | 101349405 A | * | 1/2009 |
| CN | 102308141 A |  | 1/2012 |
| JP | 2005-353498 A |  | 12/2005 |
| JP | 2006-302581 A |  | 11/2006 |

(Continued)

OTHER PUBLICATIONS

Yoshikawa, "Lighting Device, Display Device and Television Receiver," U.S. Appl. No. 13/375,547, filed Dec. 1, 2011.

(Continued)

*Primary Examiner* — Mike Stahl
(74) *Attorney, Agent, or Firm* — Keating & Bennett, LLP

(57) ABSTRACT

An object of the present invention is to stably fix a light source board without using any screw. A backlight unit 12 according to the present invention includes an LED board 18 including an LED 17 as a light source, a chassis 14 that stores the LED board 18 and has an opening 14*b* through which light from the LED 17 exits, and a holding member 20 that extends in at least one direction along a plate surface of the LED board 18 and is fixed to the chassis 14 so as to hold the LED board 18 together with the chassis between the holding member 20 and the chassis 14.

34 Claims, 29 Drawing Sheets

(56) References Cited

FOREIGN PATENT DOCUMENTS

| | | |
|---|---|---|
| JP | 2006-310045 A | 11/2006 |
| JP | 2007-317423 A | 12/2007 |
| JP | 2008-198398 A | 8/2008 |
| JP | 2009-129706 A | 6/2009 |
| WO | 2009/002081 A2 | 12/2008 |

OTHER PUBLICATIONS

Official Communication issued in International Patent Application No. PCT/JP2010/056205, mailed on Jul. 13, 2010.

* cited by examiner

FIG.1
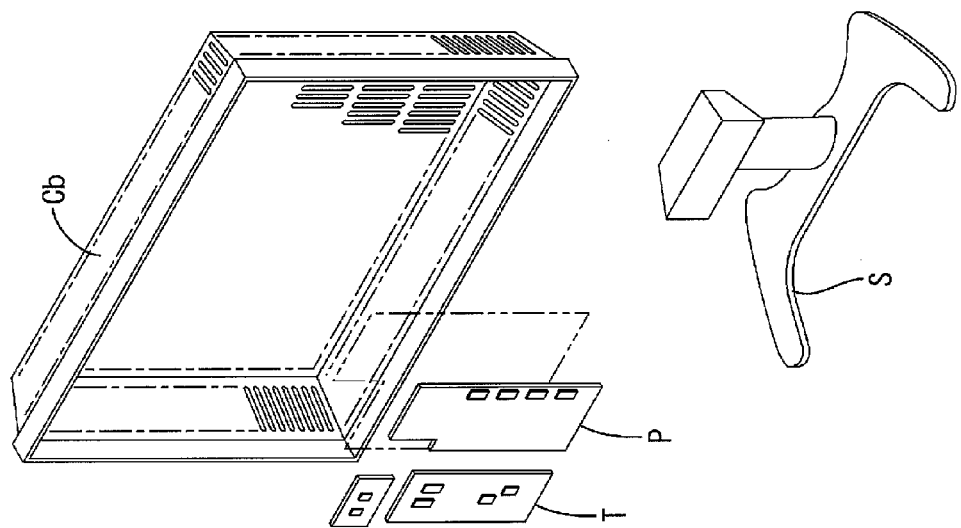
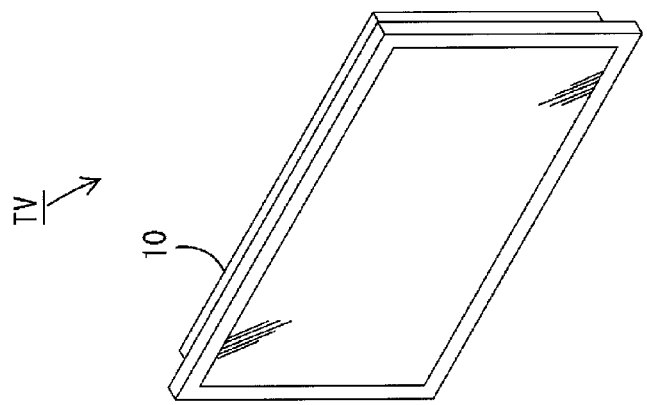
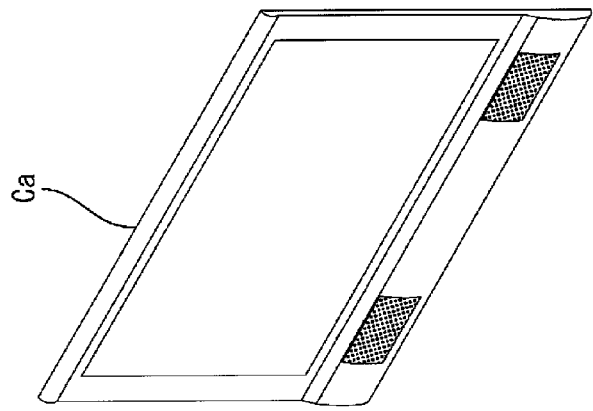

FIG.2
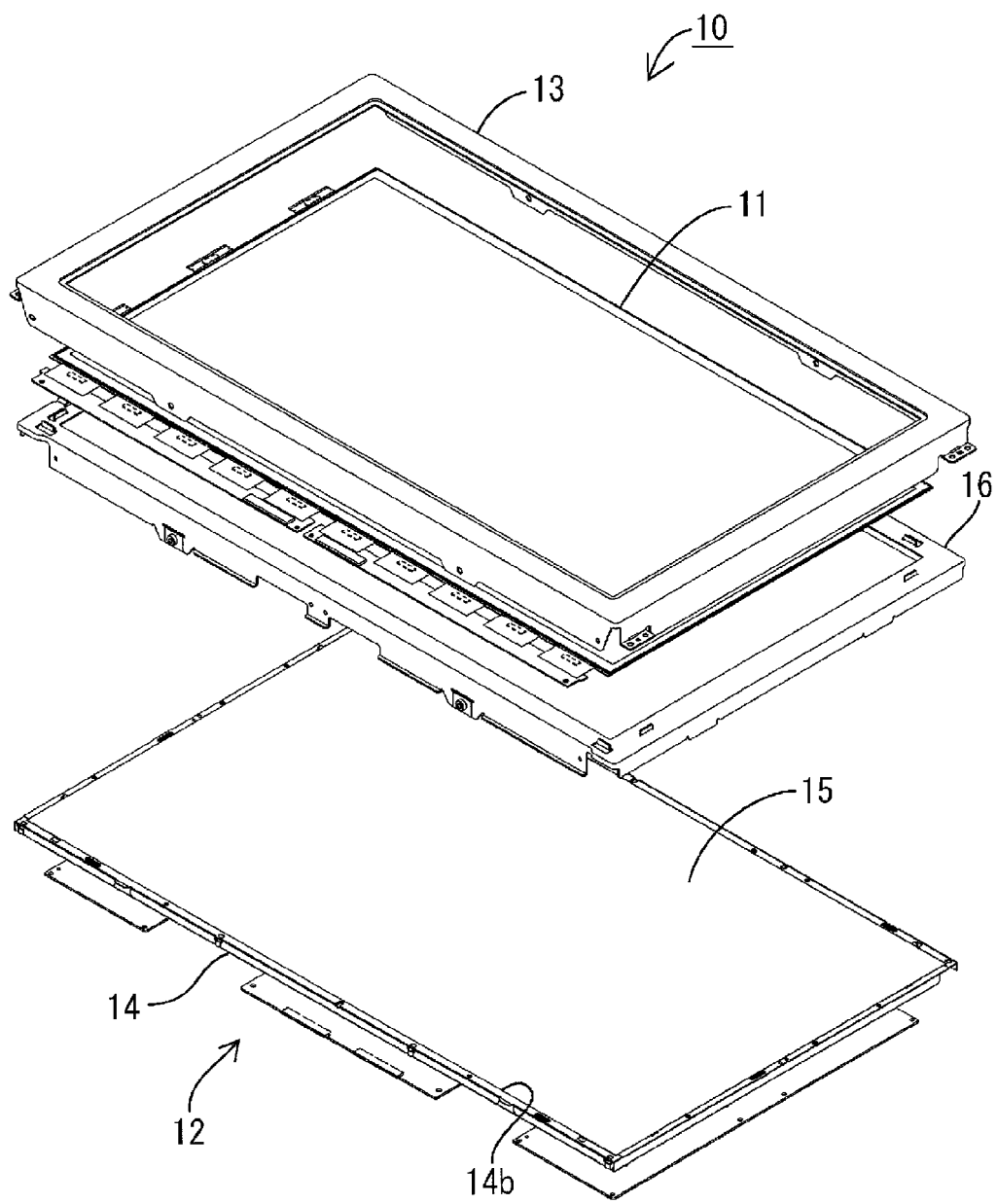
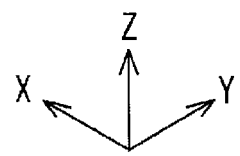

LIGHTING DEVICE, DISPLAY DEVICE AND TELEVISION RECEIVER

TECHNICAL FIELD

The present invention relates to a lighting device, a display device and a television receiver.

BACKGROUND ART

For example, a liquid crystal panel used for a liquid crystal display device such as a liquid crystal television set does not emit light by itself, and therefore, requires a separate backlight unit as a lighting device. The backlight unit is installed on aback side of the liquid crystal panel (side opposite to a display surface) and includes a chassis, a surface of which is opened on the liquid crystal panel side, a light source stored in the chassis, and an optical member (diffuser sheet, etc.) that is arranged on the opening side of the chassis and efficiently discharges light emitted from the light source to the liquid crystal panel. Among the above-mentioned components of the backlight unit, the light source adopts, for example, an LED, and in such case, an LED board that mounts the LED thereon is stored in the chassis.

An example of the backlight unit using the LED as the light source is described in Patent Document 1.

RELATED ART DOCUMENT

Patent Document

Patent Document 1: Japanese Unexamined Patent Publication No. 2007-317423

PROBLEM TO BE SOLVED BY THE INVENTION

In fixedly attaching the LED board to the chassis, a screw is generally used. However, since the screw is a point member with respect to the plate surface of the LED board, in order to stably fix the LED board, a lot of screws must be distributed in the plate surface of the LED board. For this reason, the number of used screws and the number of times of the attachment operation of the screw tend to increase, resulting in an increase in costs and lowering of working efficiency. Especially, as the number of the LED boards increases with an increase in screen size of a liquid crystal display device, the number of screws used and the number of times of screw attaching works increase and accordingly, the above-mentioned problem becomes more prominent.

DISCLOSURE OF THE PRESENT INVENTION

The present invention is made in view of the above-mentioned circumstances and its object is to stably fix a light source board without using any screw.

A lighting device according to the present invention includes a light source board, a chassis, and a holding member. The light source board includes a light source. The chassis stores the light source board therein and has an opening through which light from the light source exits. The holding member extends in at least one direction along a plate surface of the light source board. The holding member is fixed to the chassis so as to hold the light source board together with the chassis between the holding member and the chassis.

With this configuration, when the holding member is fixed to the chassis, the light source board is sandwiched between the holding member and the chassis. Since the light source board is fixed by use of the holding member extending in at least one direction along the plate surface of the light source board, as compared to the case of using the point screw with respect to the plate surface of the light source board as conventional, even when the number of holding members used is small, the light source board can be fixed stably. Since the number of holding members used is reduced, the number of components and man hours for assembling can be reduced, thereby improving working efficiency. Then, since the light source board can be fixed stably, it is possible to stabilize optical characteristics of light that is generated from the light source and is emitted from the opening of the chassis, as well as heat radiation property from the light source board to the chassis.

BRIEF DESCRIPTION OF THE DRAWINGS

FIG. 1 is an exploded perspective view showing a schematic configuration of a television receiver according to a first embodiment of the present invention;

FIG. 2 is an exploded perspective view showing a schematic configuration of a liquid crystal display device provided in the television receiver;

BEST MODE FOR CARRYING OUT THE INVENTION

<First Embodiment>

Figure 3:
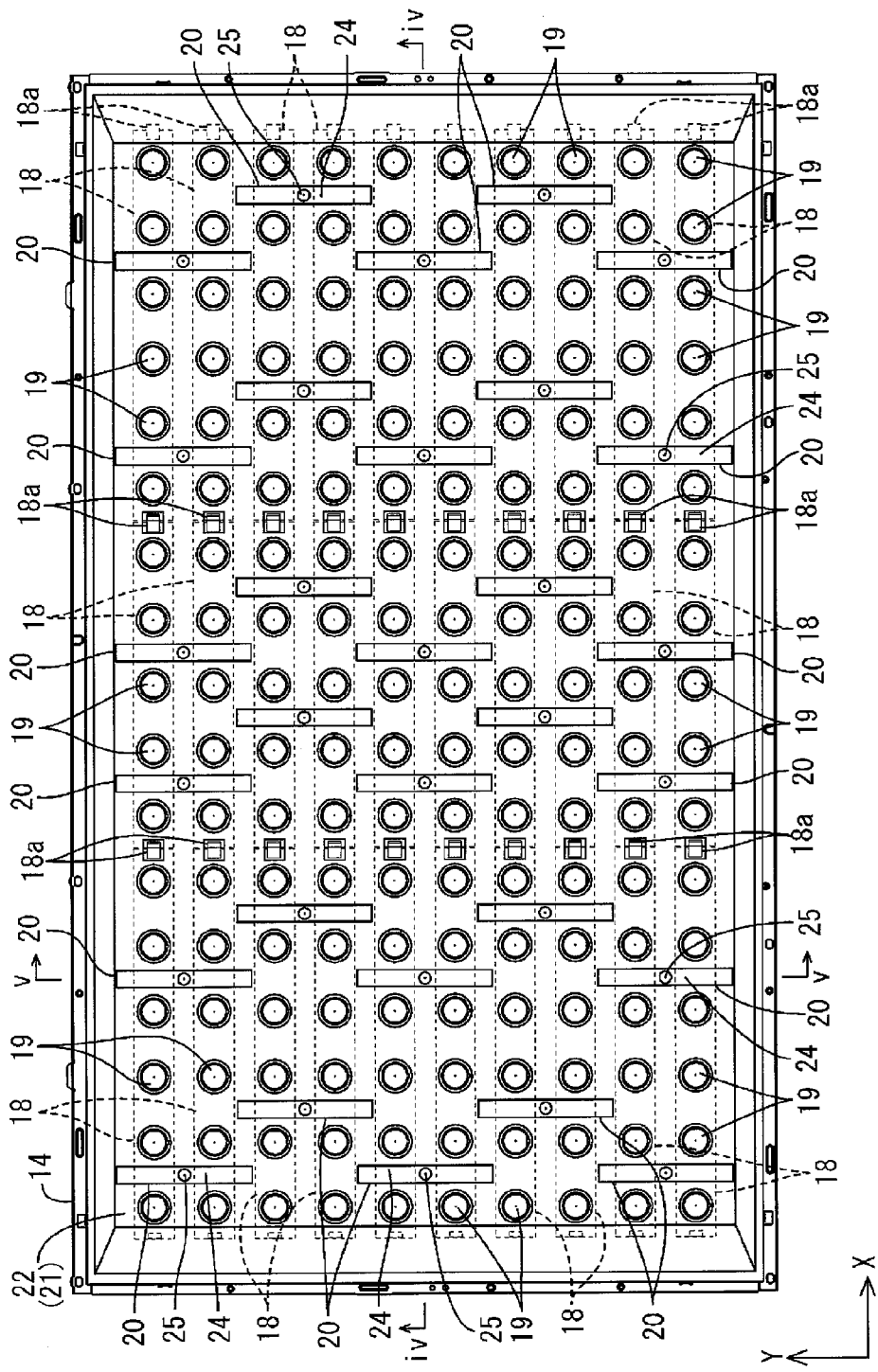
FIG. 3 is a plan view showing an arrangement of LED boards and holding members in a chassis provided in the liquid crystal display device.
Figure 4:
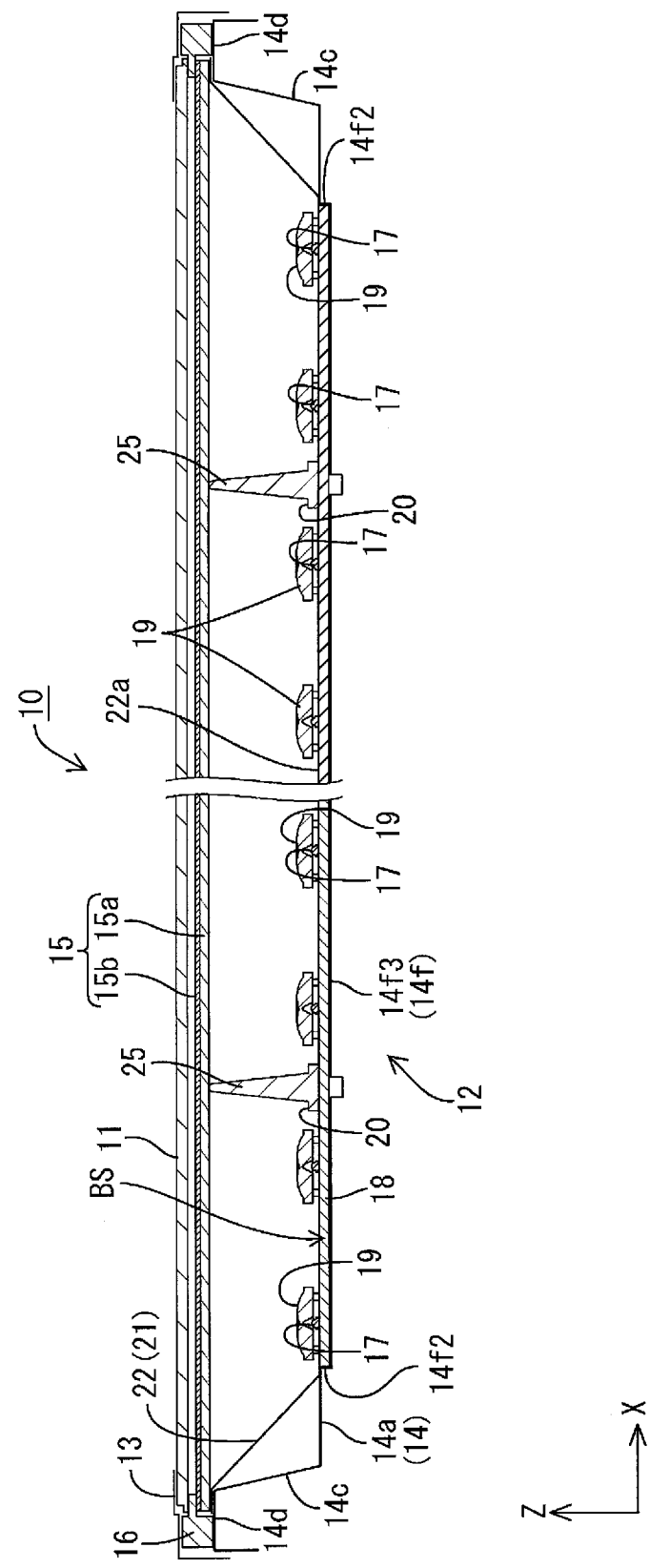
FIG. 4 is a sectional view taken along line iv-iv in FIG. 3 of the liquid crystal display device.
Figure 5:
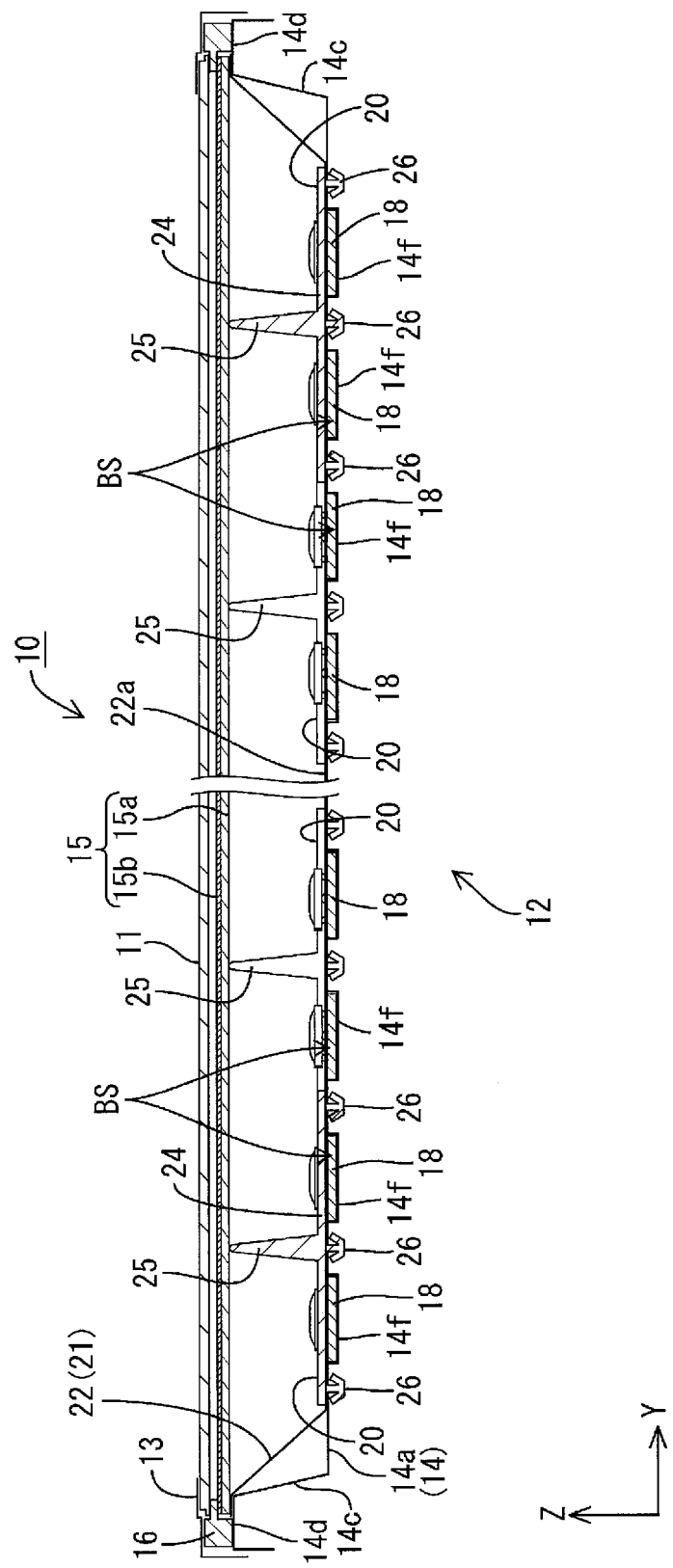
FIG. 5 is a sectional view taken along line v-v in FIG. 3 of the liquid crystal display device.

A first embodiment of the present invention will be described with reference to FIGS. 1 to 14. In this embodiment, a liquid crystal display device 10 is used as an example. A part of each figure shows an X-axis, a Y-axis and a Z-axis, and a direction of each axis is represented in each figure. It is given that an upper side in FIGS. 4 and 5 is a front side and a lower side in these figures is a back side.

A television receiver TV according to this embodiment includes, as shown in FIG. 1, the liquid crystal display device 10, front and back cabinets Ca, Cb that store the liquid crystal display device 10 therebetween, a power source P, a tuner T and a stand S. The liquid crystal display device (display device) 10 is shaped like an oblong quadrangle as a whole (rectangular) and is stored in a longitudinally mounted state. The liquid crystal display device 10 includes, as shown in FIG. 2, a liquid crystal panel 11 as a display panel and a backlight unit (lighting device) 12 as an external light source, and these components are integrally held by a frame bezel 13 or the like. In this embodiment, it is assumed that a screen size is 42 inches and an aspect ratio is 16:9.

Next, the liquid crystal panel 11 and the backlight unit 12 that constitute the liquid crystal display device 10 will be successively described. The liquid crystal panel (display panel) 11 among them is rectangular in a plan view, and is formed by sticking a pair of glass substrates to each other with a predetermined gap therebetween and filling a liquid crystal between the both glass substrates. One glass substrate has a switching component (for example, TFT) connected to a source wiring and a gate wiring that are perpendicular to each other, a pixel electrode connected to the switching component and an alignment film, and the other glass substrate has a color filter in which color sections of R (red), G (green), B (blue) are arranged in a predetermined pattern, a counter electrode and an alignment film and the like. Polarizing plates are provided outer of the both substrates.

Subsequently, the backlight unit 12 will be described in detail. The backlight unit 12 includes, as shown in FIG. 2, a substantially box-like chassis 14 having openings 14b on the side of a light emitting surface (the liquid crystal panel 11 side), an optical member group 15 (a diffuser (light diffusing member) 15a, and a plurality of optical sheets 15b arranged between the diffuser 15a and the liquid crystal panel 11) arranged so as to cover the openings 14b of the chassis 14, and a frame 16 that is arranged along an outer edge of the chassis 14 and holds an outer edge of the optical member group 15 between the frame 16 and the chassis 14. In the chassis 14, as shown in FIGS. 3 to 5, LEDs 17 (Light Emitting Diode) as light sources, LED boards 18 that mount the LEDs 17 thereon and diffuser lenses 19 attached at positions corresponding to the LEDs 17 on the LED boards 18 are provided. The chassis 14 further includes holding members 20 configured to hold the LED boards 18 between the holding members 20 and the chassis 14 and a reflection sheet 21 that reflects light in the chassis 14 toward the optical member 15. In the backlight unit 12, the side of the optical member 15, not the LEDs 17, is set as a light emitting side. Hereinafter, each component of the backlight unit 12 will be described in detail.

The chassis 14 is made of metal, and as shown in FIGS. 3 to 5, consists of a rectangular bottom plate 14a like the liquid crystal panel 11, side plates 14c rising from outer ends of sides of the bottom plate 14a and receiving plates 14d extending outward from rising ends of the respective side plates 14c, and is shaped like a shallow box (shallow dish) opened toward the front side as a whole. In the chassis 14, its long-side direction corresponds to the X-axis direction (horizontal direction) and its short-side direction corresponds to the Y-axis direction (vertical direction). The frame 16 and the below-mentioned optical member 15 can be mounted on each of the receiving plates 14d of the chassis 14 from the front side. The frame 16 is secured to each of the receiving plates 14d with a screw. The bottom plate 14a of the chassis 14 includes opened attachment holes 14e for attaching the holding members 20. The plurality of attachment holes 14e in the bottom plate 14a corresponding to attachment positions of the holding members 20 is arranged. The bottom plate 14a of the chassis 14 further includes board positioning portions 14f for positioning the LED boards 18 and detail of which will be described later.

Figure 7:
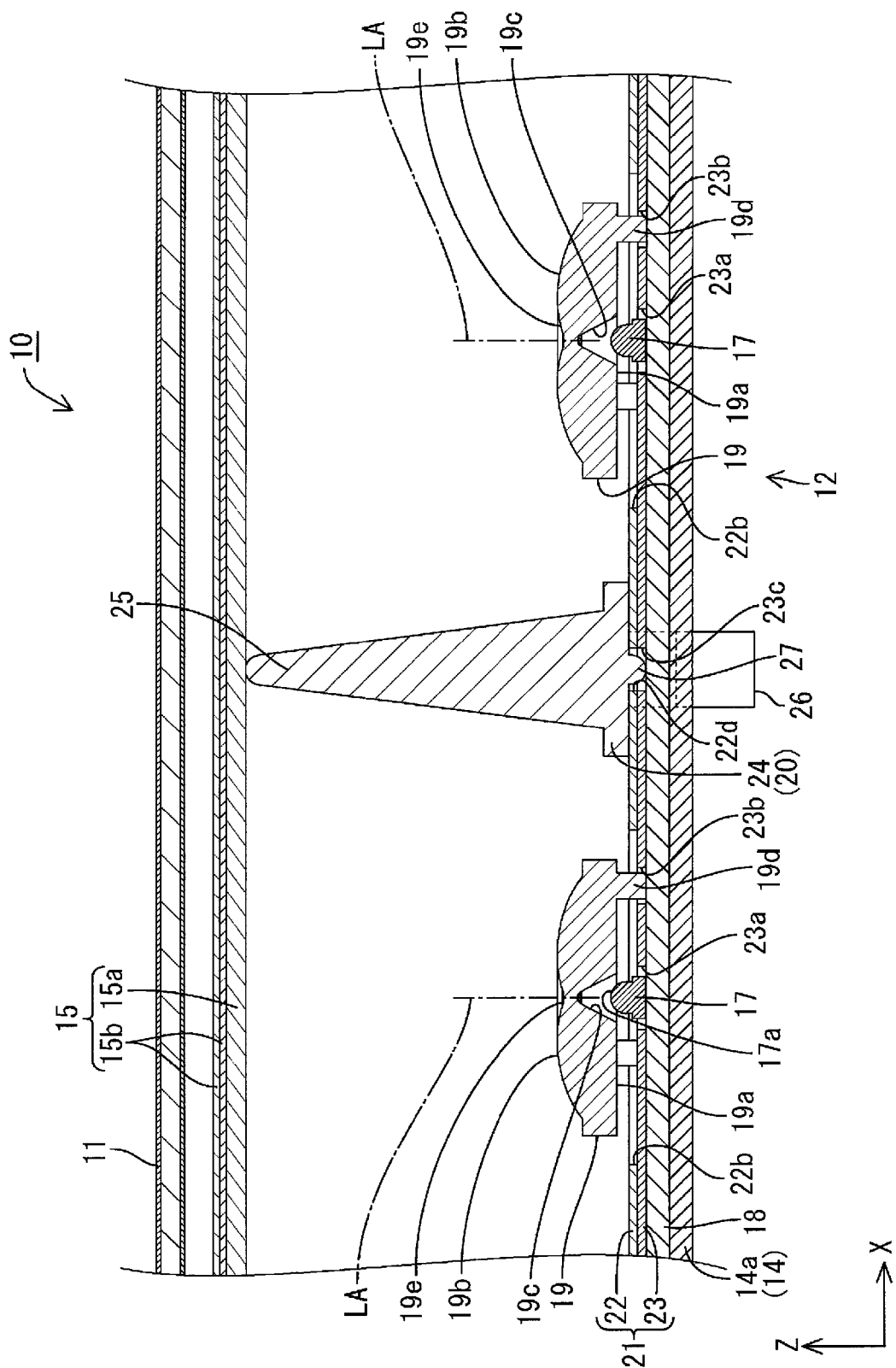
FIG. 7 is a sectional view taken along line vii-vii in FIG. 6.
Figure 8:
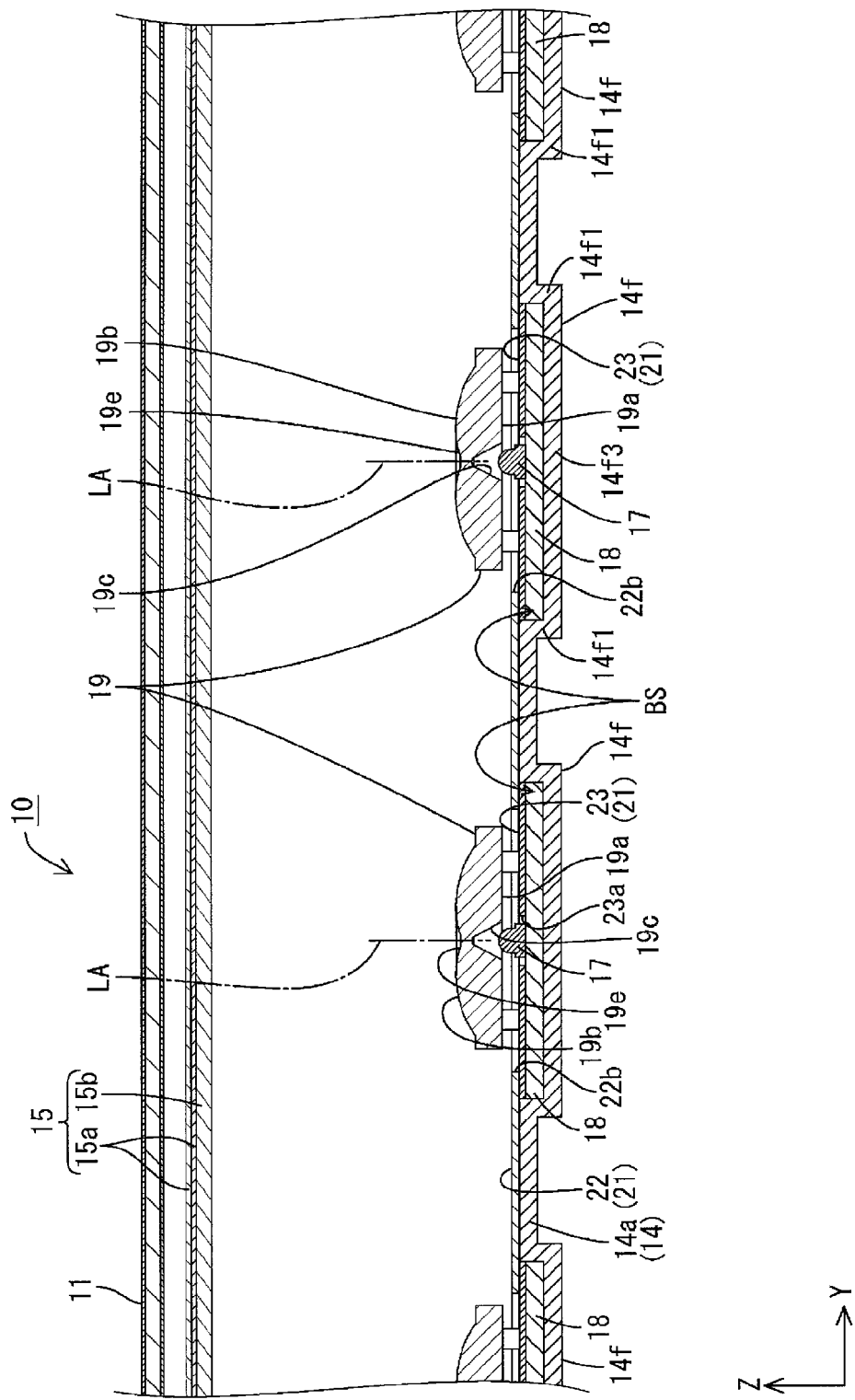
FIG. 8 is a sectional view taken along line viii-viii in FIG. 6.
Figure 9:
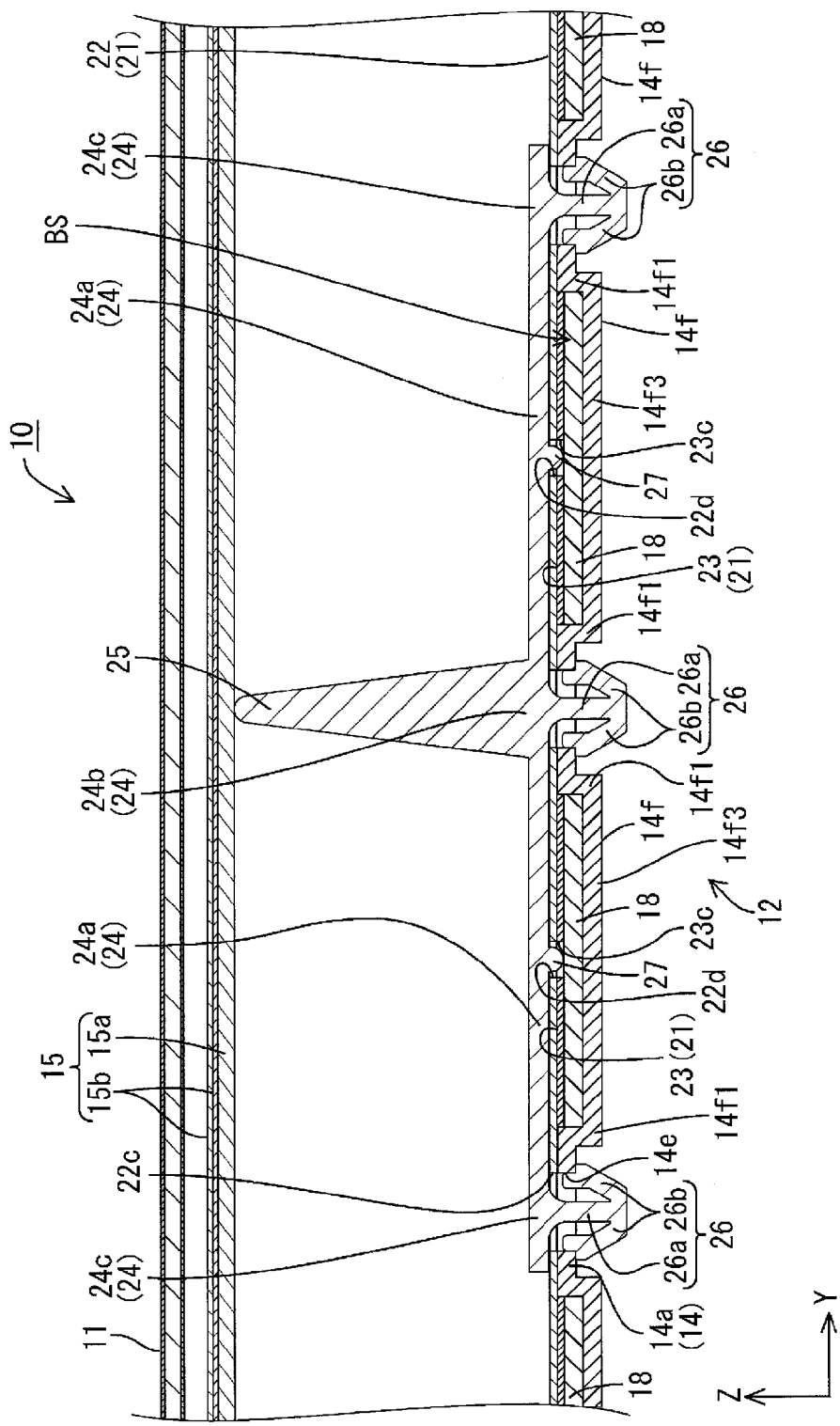
FIG. 9 is a sectional view taken along line ix-ix in FIG. 6.

As shown in FIG. 2, like the liquid crystal panel 11 and the chassis 14, the optical member 15 is shaped like an oblong quadrangle (rectangular) in a plan view. As shown in FIGS. 4 and 5, the optical member 15 covers the openings 14b of the chassis 14 by placing its outer edge on the receiving plates 14d, and is arranged between the liquid crystal panel 11 and the LEDs 17. The optical member 15 consists of the diffuser 15a arranged on the back side (the side of the LEDs 17, the side opposite to the light-emitting side) and the optical sheets 15b arranged on the front side (the side of the liquid crystal panel 11, the light-emitting side). The diffuser 15a is formed by dispersing multiple diffusing particles in a substantially transparent resin base member having a predetermined thickness and has a function of diffusing transmitted light. The optical sheet 15b is shaped like a thinner sheet than the diffuser 15a and two sheets are laminated (FIGS. 7 to 9). Specific examples of the optical sheets 15b include diffuser sheets, lens sheets, reflection type polarizing sheets, and it is possible to select and use any of these sheets as appropriate.

As shown in FIG. 2, the frame 16 is shaped like a frame along outer circumferences of the liquid crystal panel 11 and the optical member 15. An outer edge of the optical member 15 can be pinched between the frame 16 and each of the receiving plates 14d (FIGS. 4 and 5). The frame 16 can receive the outer edge of the liquid crystal panel 11 from the back side and pinch the outer edge of the liquid crystal panel 11 between the frame 16 and the bezel 13 arranged on the front side (FIGS. 4 and 5).

Next, the LEDs 17 and the LED boards 18 that mount the LEDs 17 thereon will be described in detail. As shown in FIG.

Figure 10:
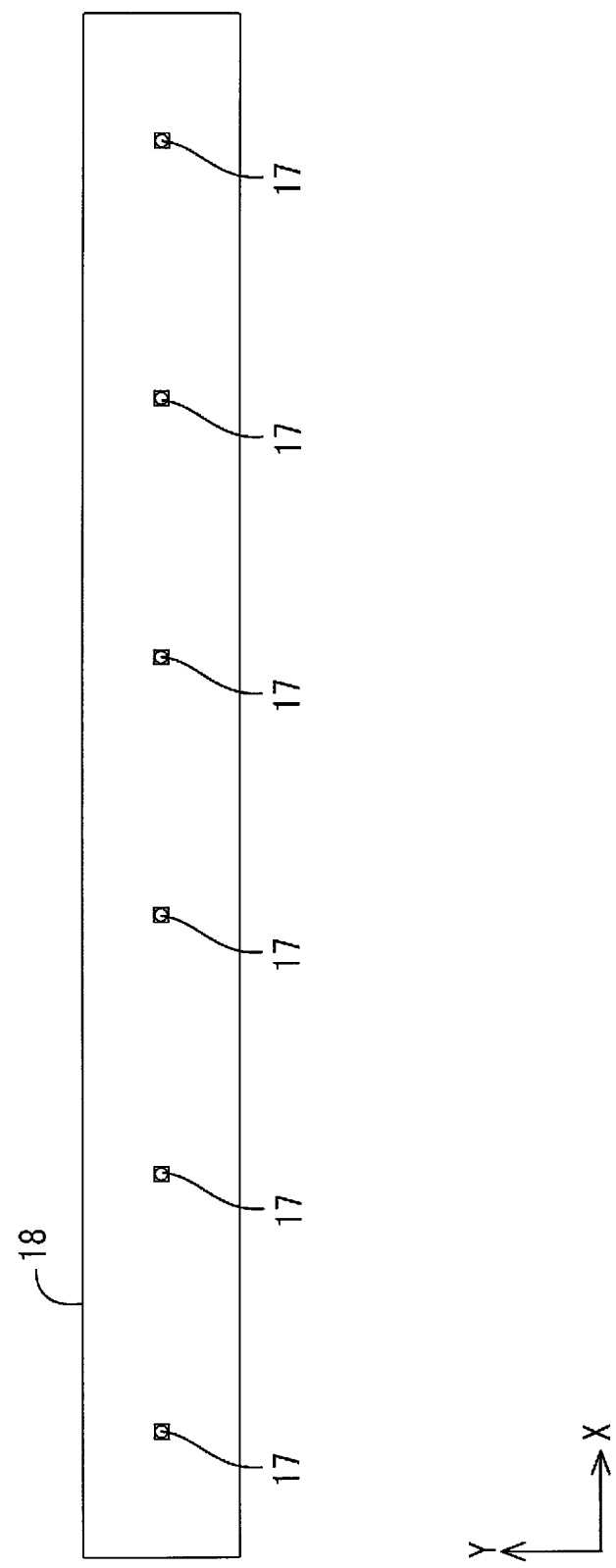
FIG. 10 is a plan view of the LED board.

7, FIG. 8 and FIG. 10, each of the LEDs 17 is formed by sealing an LED chip on a board portion fixedly attached to the LED board 18 with a resin material. The LED chip mounted on the board portion has one type of main light-emitting wavelength, and specifically, emits only blue light. Meanwhile, phosphors converting blue light emitted by the LED chip into white light are dispersedly mixed in the resin material sealing the LED chip. Thereby, the LED 17 can emit white light. This LED 17 is a so-called top type in which a surface on the side opposite to the mounting surface of the LED board 18 acts as a light-emitting surface 17a. An optical axis LA in the LED 17 substantially corresponds to the Z-axis direction (the direction perpendicular to the liquid crystal panel 11 and a main plate surface of the optical member 15). Light emitted from the LEDs 17 extends radially to some extent about the optical axis LA within a predetermined angular range in a three-dimensional way, and has a higher directivity than light from a cold cathode tube. That is, the light emission intensity of the LED 17 becomes remarkably high in a direction along the optical axis LA and rapidly lowers as inclination angle relative to the optical axis LA is larger.

As shown in FIG. 10, the LED board 18 has a base member shaped like a rectangle in a plan view, and is stored in the chassis 14 so that its long-side direction aligns with the X-axis direction and its short-side direction aligns with the Y-axis direction (FIG. 3). The base member of the LED board 18 is made of metal such as aluminum material that is the same as the material for the chassis 14, and has a surface on which a wiring pattern formed of a metal film such as a copper foil is formed via an insulating layer. Insulating materials such as ceramic can be used as the material for the base member of the LED board 18. As shown in FIG. 7, FIG. 8 and FIG. 10, the LEDs 17 having the above-mentioned configuration are mounted on a surface facing the front side (surface facing the optical member 15 side) among surfaces of the base member of the LED board 18. The plurality of LEDs 17 is linearly arranged along the long-side direction of the LED boards 18 (X-axis direction) in parallel, and is serially connected according to the wiring pattern formed on the LED boards 18. The alignment pitch of the LEDs 17 is almost constant, that is, the LEDs 17 are arranged at regular intervals. Each of the LED boards 18 has a connector portion 18a at both ends thereof in the long-side direction.

As shown in FIG. 3, the LED boards 18 having the above-mentioned configuration are arranged in the chassis 14 in each of the X-axis direction and the Y-axis direction so that the LED boards 18 are aligned in the long-side direction and the short-side direction in parallel. That is, the LED boards 18 and the LEDs 17 mounted thereon are arranged in the chassis 14 in a matrix having the X-axis direction (the long-side direction of the chassis 14 and the LED board 18) as a row direction and the Y-axis direction (the short-side direction of the chassis 14 and the LED board 18) as the column direction. Specifically, the three LED boards 18 in the X-axis direction× the ten LED boards 18 in the Y-axis direction, that is, 30 LED boards 18 in total are arranged in the chassis 14 in parallel. In this embodiment, two types of LED boards 18 having different long-side dimensions and the number of mounted LEDs 17 are used. Specifically, a six-mounted type of the LED board 18 that mounts the six LEDs 17 thereon and has a relatively long long-side dimension and a five-mounted type of the LED board 18 that mounts the six LEDs 17 thereon and has a relatively short long-side dimension are used as the LED boards 18, and the six-mounted type of the LED board 18 is arranged at each end of the chassis 14 in the X-axis direction and the five-mounted type of the LED board 18 is arranged at the center in the same direction. As described above, the LED boards 18 aligned in one row in the X-axis direction are electrically connected to each other by fitting the adjacent connector portions 18a with each other, and the connector portions 18a located at both ends of the chassis 14 in the X-axis direction are each electrically connected to an external control circuit not shown. Thereby, the LEDs 17 arranged on the LED board 18 forming one row are serially connected to one another, so that lighting-on and off of the lot of LEDs 17 contained in the one row can be controlled together by one control circuit, which enables reduction in costs. Even the different types of LED boards 18 having different long-side dimensions and the number of mounted LEDs 17 have the substantially identical short-side dimension and alignment pitch of the LEDs 17.

By preparing plural types of LED boards 18 having different long-side dimensions and the number of mounted LEDs 17 and appropriately using the different types of LED boards 18 in combination, following effects can be obtained. That is, plural types of liquid crystal display device 10 having different screen sizes can be manufactured by appropriately changing the appropriateness of use of each type of LED board 18 and the number of LED boards 18 of each type according to each screen size, and as compared to the case where an LED board having the same long-side dimension as the long-side dimension of the chassis 14 is prepared for each screen size, the number of types of necessary LED boards 18 can be greatly reduced, which enables reduction in costs. Specifically, by adding an eight-mounted type LED board that mounts eight LEDs 17 thereon to the above-mentioned two types of LED boards 18 (the five-mounted type and the six-mounted type) and appropriately using the three types of LED boards 18 in combination, each of the liquid crystal display devices 10 having the screen size of 26 inches, 32 inches, 37 inches, 40 inches, 42 inches, 46 inches, 52 inches and 65 inches can easily be manufactured.

The LED boards 18 arranged in the chassis 14 as described above are positioned along the plate surfaces by the board positioning portions 14f. The board positioning portion 14f will be described below in detail. As shown in FIGS. 4 and 5, the board positioning portion 14f is formed by partially protruding the bottom plate 14a to the back side, that is, the side opposite to the opening 14b so as to hold a board storing space BS that can store the LED board 18 from the front side. The board positioning portion 14f is shaped by drawing the bottom plate 14a. The board positioning portion 14f has a predetermined width in the Y-axis direction, and is substantially shaped like a rail linearly extending in the X-axis direction. That is, the long-side direction and the short-side direction of the board positioning portion 14f match those of the bottom plate 14a, respectively. The board positioning portion 14f is rectangular in a plan view, and has almost the same outer shape as the LED board 18. That is, the long-side dimension and the short-side dimension of the board positioning portion 14f have a clearance that can store the LED board 18, but are almost the same as those of the LED board 18. Arrangement of the board positioning portions 14f on the bottom plate 14a corresponds to the above-mentioned arrangement of the LED boards 18 on the bottom plate 14a (FIG. 3), and the plurality of board positioning portions 14f is arranged both in the X-axis direction and the Y-axis direction in a matrix. Description of detailed arrangement of the board positioning portions 14f on the bottom plate 14a, which overlaps description of arrangement of the LED boards 18, is omitted.

As shown in FIGS. 4 and 5, each board positioning portion 14f consists of side wall parts 14f1 and 14f2 protruding from the bottom plate 14a toward the backside along the Z-axis direction and a bottom wall part 14f3 connecting the side wall parts 14f1 and 14f2 to each other to form a bag opened to the front side as a whole. The sidewall parts 14f1 and 14f2 are a pair of long-side side wall parts 14f1 extending in the X-axis direction (long-side side edge of the LED board 18) and a pair of short-side side wall parts 14f2 extending in the Y-axis direction (short-side side edge of the LED board 18). As shown in FIG. 8, the long-side sidewall parts 14f1 are configured to contact with the long-side side edge of the LED board 18, thereby positioning the LED board 18 in the Y-axis direction. As shown in FIG. 4, the short-side sidewall parts 14f2 is configured to contact with the short-side side edge of the LED board 18, thereby positioning the LED board 18 in the X-axis direction. That is, when being stored in the board storing space BS, the LED board 18 is positioned in the X-axis direction and the Y-axis direction that are perpendicular to each other in a two-dimensional way by the board positioning portion 14f. The protruding dimension of the board positioning portion 14f from the bottom plate 14a is set to be about a sum of the thickness of the LED board 18 and the thickness of a second reflection sheet 23 described later. Accordingly, when the LED board 18 is stored in the board storing space BS, it is prevented that the LED board 18 protrudes from the board positioning portion 14f to the front side, and in the state where the second reflection sheet 23 is placed on the LED board 18, a front side surface of the second reflection sheet 23 is substantially in flush with a front side surface of the bottom plate 14a.

Figure 11:
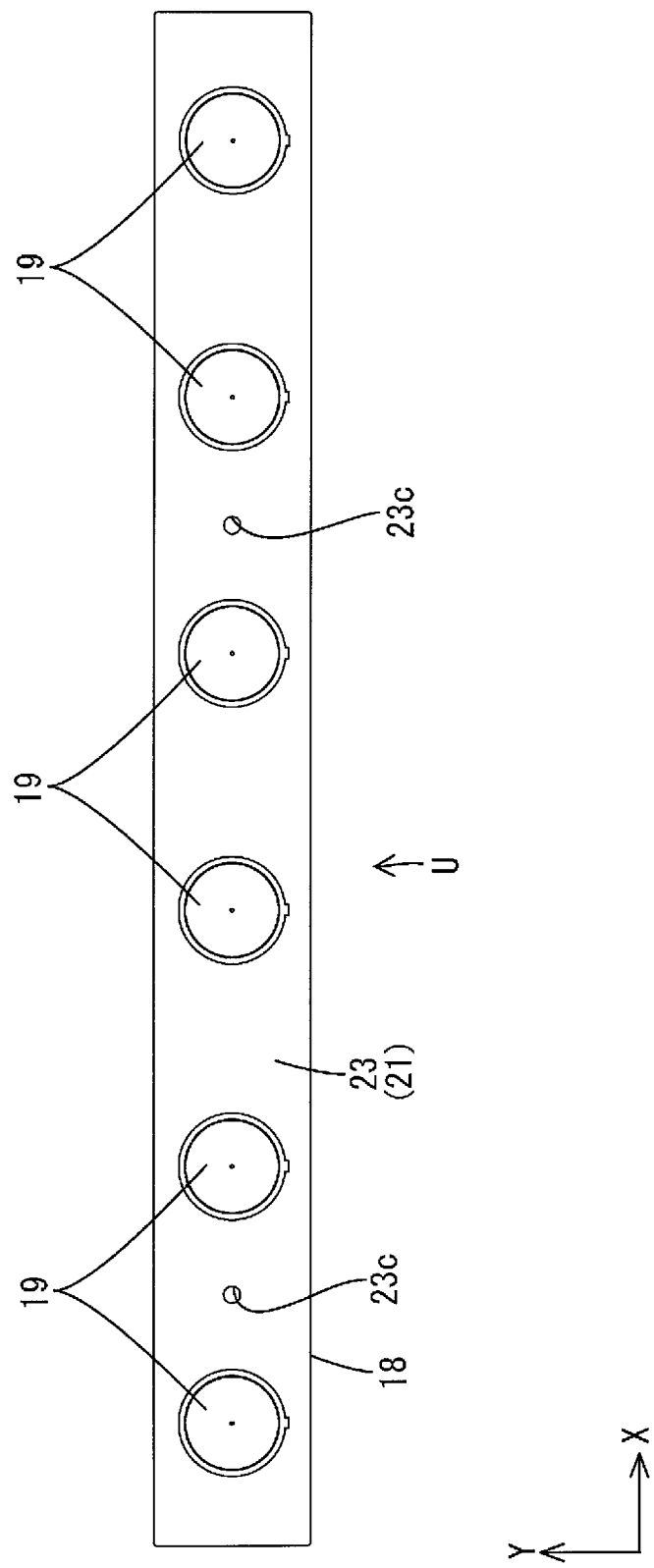
FIG. 11 is a plan view showing the state where a second reflection sheet and diffuser lenses are attached to the LED board (light source unit)

The diffuser lenses 19 are made of a synthetic resin material (e.g. polycarbonate and acrylic) that is substantially transparent (highly light transmissive) and has a higher refractive index than air. As shown in FIG. 7, FIG. 8 and FIG. 11, the diffuser lenses 19 each have a predetermined thickness, are formed to be substantially circular in a plan view, and are attached so as to cover the respective LEDs 17 from the front side of the LED board 18, that is, to overlap with the respective LEDs 17 in a plan view. The diffuser lenses 19 can emit highly directive light from the LEDs 17 while diffusing the light. That is, since directivity of the light emitted from the LEDs 17 is reduced through the diffuser lenses 19, even when the interval of the adjacent LEDs 17 is set large, an area between the LEDs 17 is hard to be visually recognized as a dark place. Thereby, the number of installed LEDs 17 can be reduced. Each diffuser lens 19 is located to be substantially concentric with each LED 17 in a plan view. The diffuser lens 19 is sufficiently larger than the LED 17 both in the X-axis direction and the Y-axis direction, but is smaller than the LED board 18.

In each of the diffuser lenses 19, a surface that faces the back side and is opposite to the LED board 18 is a light incidence surface 19a on which light from the LED 17 is incident, while a surface that faces the front side and is opposite to the optical member 15 is a light emitting surface 19b. As shown in FIGS. 7 and 8, the light incidence surface 19a extends in parallel to a plate surface of the LED board 18 (the X-axis direction and the Y-axis direction) as a whole, but has an inclined surface obtained by forming a light incidence-side concave portion 19c in an area where the light incidence surface 19a and the LED 17 overlap with each other in a plan view. The light incidence-side concave portion 19c is substantially conical, is located to be almost concentric with the diffuser lens 19 and is opened toward the back side, that is, the LED 17. The light incidence-side concave portion 19c has the largest diameter at its opened end facing the LED 17, which is larger than the diameter of the LED 17, and becomes smaller toward the front side in diameter continually and gradually, and finally becomes the smallest at its end of the front side. The light incidence-side concave portion 19c has a substantially inverted V-shaped cross section and a circumferential surface thereof is inclined relative to the Z-axis direction. The inclined surface is inclined so that the end of the front side crosses the optical axis LA of the LED 17. Accordingly, light emitted from the LED 17 and entering into the light incidence-side concave portion 19c is incident into the diffuser lens 19 through the inclined surface. At this time, the incident light is refracted away from the center, that is, with a wide angle, by an inclined angle of the inclined surface relative to the optical axis LA and is incident into the diffuser lens 19.

Attachment shaft portions 19d that protrude toward the LED board 18 and serve as attachment structure of the diffuser lens 19 to the LED board 18 are provided at positions outer of the light incidence-side concave portion 19c in the radial direction, on the light incidence surface 19a in the diffuser lens 19. The attachment shaft portions 19d are located closer to an outer edge than the light incidence-side concave portion 19c in the diffuser lens 19, and a line connecting the attachment portions is substantially equilateral-triangular in a plan view. By fixing each of front ends of the attachment shaft portions 19d to the LED board 18 with an adhesive or the like, the diffuser lens 19 can be fixedly attached to the LED board 18. The diffuser lens 19 is fixed to the LED board 18 through the attachment shaft portions 19d so as to have a predetermined gap between the light incidence surface 19a and the LED board 18. This gap allows incidence of light from space outer of the diffuser lens 19 in a plan view. In the above-mentioned attachment state, a front end of the LED 17 protruding from the LED board 18 enters into the light incidence-side concave portion 19c.

The light emitting surface 19b in the diffuser lens 19 is shaped like a substantially flat spherical surface. Thereby, the diffuser lens 19 can emit light while refracting the light on an interface with an external air layer in a direction away from the center, that is, with a wide angle. The light emitting surface 19b has a light-emitting side concave portion 19e. The light-emitting side concave portion 19e is formed in an area where the light emitting surface 19b overlaps with the LED 17 in a plan view. The light-emitting side concave portion 19e is substantially bowl-like and is shaped like a substantially flat sphere having a circumferential surface inclined downward toward the center. An angle that a tangent line to the circumferential surface of the light-emitting side concave portion 19e forms with the optical axis LA of the LED 17 is set to be larger than an angle that the inclined surface of the light incidence-side concave portion 19c forms with the optical axis LA. The area where the light emitting surface 19b overlaps with the LED 17 in a plan view receives extremely larger light amount from the LED 17 than the other area and therefore, its brightness tends to locally become high. However, by forming the light-emitting side concave portion 19e in the area, it becomes possible to emit most of the light from the LED 17 while refracting the light with a wide angle, or reflect a part of the light from the LED 17 toward the LED board 18. Thereby, it is possible to prevent the brightness of the area where the light emitting surface 19b overlaps with the LED 17 from locally becoming high, which is preferable for prevention of uneven brightness.

Next, the reflection sheet 21 will be described. The reflection sheet 21 consists of a first reflection sheet 22 that covers the substantially entire range of the inner surface of the chassis 14 and a second reflection sheet 23 that covers each of the LED boards 18. Both the reflection sheets 22 and 23 are made of synthetic resin and have a white surface with excellent light reflectance.

First, the first reflection sheet 22 will be described. As shown in FIG. 3, most part of the first reflection sheet 22 on the center side, which extends along the bottom plate 14a of the chassis 14, is a body portion 22a.

Figure 6:
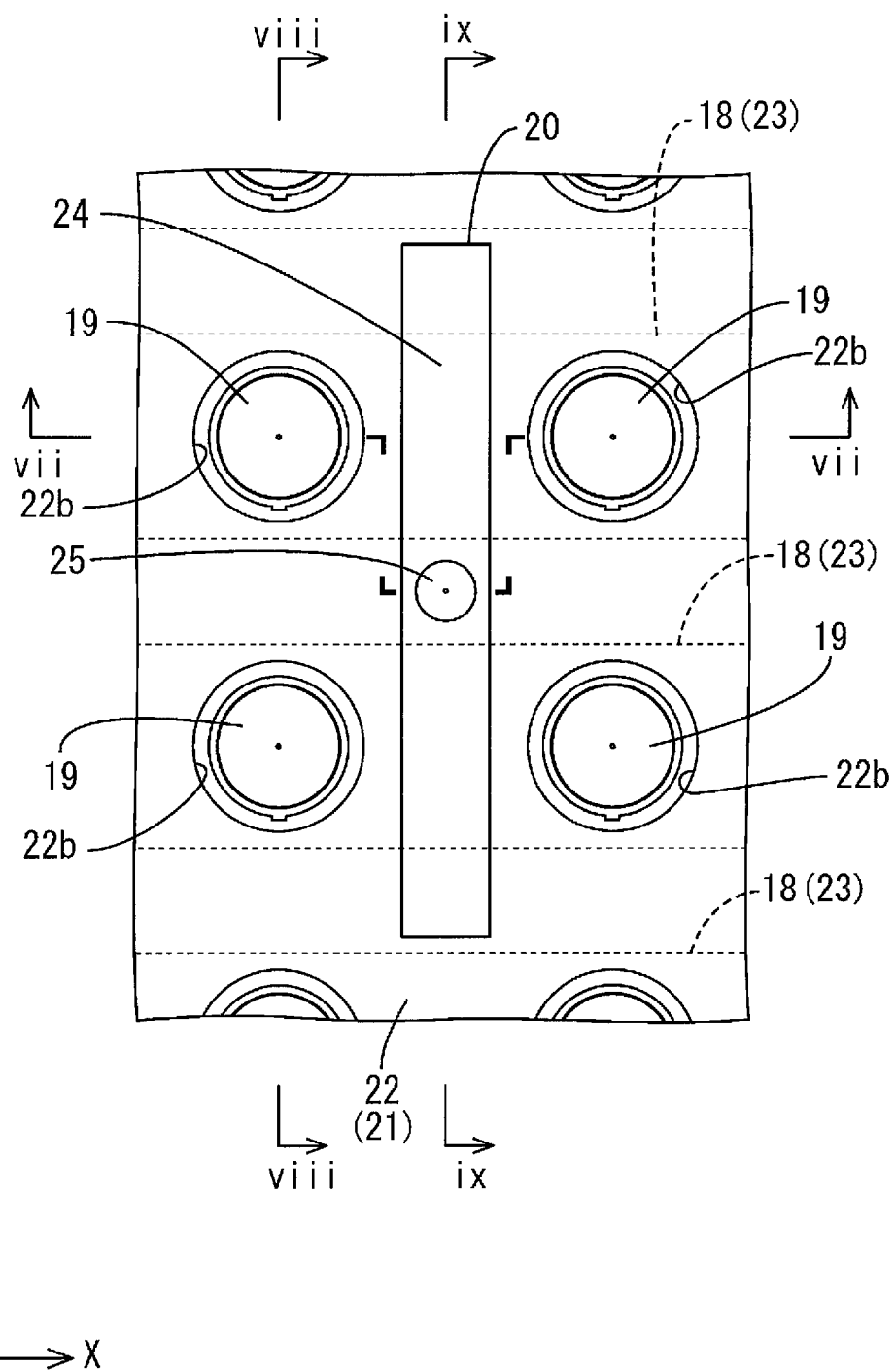
FIG. 6 is a plan view showing a detailed arrangement of the LED boards and the holding members.

The body portion 22a has almost the same dimension as the bottom plate 14a in a plan view and is sufficiently larger than each board positioning portion 14f. The body portion 22a includes an penetrating (opened) lens insertion hole 22b configured to pass both each LED 17 arranged in the chassis 14 and each diffuser lens 19 covering the LED 17 therethrough are formed in the body portion 22a. The plurality of lens insertion holes 22b is arranged in parallel at positions where the holes 22b overlap with the LEDs 17 and diffuser lenses 19 on the body portion 22a in a plan view in a matrix. As shown in FIG. 6, each lens insertion hole 22b is circular in a plan view and has a larger diameter than the diffuser lens 19. Thereby, when the first reflection sheet 22 is installed in the chassis 14, the diffuser lenses 19 can surely be inserted into the respective lens insertion holes 22b irrespective of presence or absence of dimension error. As shown in FIG. 3, since the first reflection sheet 22 covers an outer circumferential area and an area between the adjacent diffuser lenses 19 in the chassis 14, light toward the areas can be reflected toward the optical member 15. Further, as shown in FIGS. 4 and 5, outer circumferential portions of the first reflection sheet 22 rise so as to cover the side plates 14c and the receiving plates 14d of the chassis 14, and portions placed on the receiving plates 14d are sandwiched between the chassis 14 and the optical member 15. The first reflection sheet 22 has an inclined portion that connects the body portion 22a with each of the portions placed on the receiving plates 14d.

Meanwhile, the second reflection sheet 23 has, as shown in FIG. 11, almost the same appearance as the LED board 18, that is, is rectangular in a plan view. As shown in FIGS. 7 and 8, the second reflection sheet 23 is arranged so as to overlap with the front side surface of the LED board 18, and is opposite to the diffuser lens 19. That is, the second reflection sheet 23 is arranged between the diffuser lens 19 and the LED board 18. Accordingly, light returned from the diffuser lens 19 to the LED board 18 and light entering from space outer of the diffuser lens 19 in a plan view into space between the diffuser lens 19 and the LED board 18 can be reflected toward the diffuser lens 19 by the second reflection sheet 23 again. As a result, light utilization efficiency can be enhanced, thereby increasing brightness. In other words, even when the number of installed LEDs 17 is reduced to cut costs, sufficient brightness can be obtained.

As shown in FIG. 11, the long-side dimension and the short-side dimension of the second reflection sheet 23 is almost equal to those of the LED board 18 (board positioning portion 14f). That is, the second reflection sheet 23 has almost the same dimension as the LED board 18 in a plan view. Accordingly, the second reflection sheet 23 together with the LED board 18 can be stored in the board storing space BS of the board positioning portion 14f of the chassis 14. The front side surface of the second reflection sheet 23 in the stored state is substantially in flush with the bottom plate 14a, thereby preventing occurrence of a step between the second reflection sheet 23 and the bottom plate 14a. Here, the first reflection sheet 22 covers the entire range of the chassis 14, and the body portion 22a is installed along the bottom plate 14a while crossing each board positioning portion 14f. However, since the step between the bottom plate 14a and the second reflection sheet 23 (LED board 18) arranged in the board positioning portion 14f is eliminated as described above, deformation (irregularity) such as warpage of the first reflection sheet 22 is hard to occur. As a result, unevenness of light reflected by the first reflection sheet 22 is hard to occur. As shown in FIGS. 6 and 8, the short-side dimension of the second reflection sheet 23 is set to be larger than the diameter of the diffuser lens 19 and the diameter of the lens insertion hole 22b in the first reflection sheet 22. Accordingly, almost all of the edge of the lens insertion hole 22b in the first reflection sheet 22 can be arranged so as to overlap with the second reflection sheet 23 on the front side. Accordingly, the first reflection sheet 22 can be arranged on the second reflection sheet 23 so that an edge of the lens insertion hole 22b in the first reflection sheet 22 is oriented to the front side. Thereby, the first reflection sheet 22 and the second reflection sheet 23 are continuously arranged in the chassis 14 without any gap in a plan view, and the chassis 14 or the LED board 18 is hardly exposed from the lens insertion hole 22b toward the front side. Therefore, light in the chassis 14 can be efficiently reflected toward the optical member 15, which is extremely preferable for improvement of brightness. The second reflection sheet 23 includes LED insertion holes 23a that pass the respective LEDs 17 therethrough and shaft portion insertion holes 23b that insert the respective attachment shaft portions 19d of the diffuser lens 19 therethrough at overlapping positions in a plan view.

Subsequently, the holding member 20 will be described. First, arrangement of the holding members 20 in the chassis 14 will be described. As shown in FIG. 3, each holding member 20 is rectangular as a whole in a plan view, and is attached to the chassis 14 so that its long-side direction aligns with the Y-axis direction (short-side direction of the chassis 14 and the LED board 18) and its short-side direction aligns with the X-axis direction (long-side direction of the chassis 14 and the LED board 18). The plurality of holding members 20 are distributed in the bottom plate 14a of the chassis 14 in a zigzag manner. Describing in detail, the plurality of holding members 20 are arranged in parallel at predetermined intervals in the X-axis direction to form one row, and a plurality of rows are arranged in the Y-axis direction to constitute planar arrangement. The holding members in one row and the holding members in the adjacent rows in the Y-axis direction are arranged in a staggered configuration in the X-axis direction. Specifically, the six holding members 20 are arranged in the X-axis direction to form one row and the five rows are arranged in the Y-axis direction. The holding members 20 are located so as to overlap with the LED boards 18 in a plan view in the chassis 14 and are fixed to the chassis 14, thereby sandwiching the overlapping LED boards 18 between the holding members 20 and the chassis 14.

Next, the configuration of each holding member 20 will be described. The holding member 20 according to this embodiment has both of the function of holding the LED board 18 and the function of supporting the optical member 15. The holding member 20 is made of synthetic resin such as polycarbonate, and has a surface of white color having a high light reflectance. As shown in FIGS. 7 and 9, the holding member 20 includes a body portion 24 that extends along the bottom plate 14a of the chassis 14 and the plate surface of the LED board 18, a supporting portion 25 that protrudes from the body portion 24 toward the front side, that is, the optical member 15 and is configured to contact with the optical member 15, and a fixed portion 26 that protrudes from the body portion 24 to the back side, that is, the chassis 14 and is fixed to the chassis 14.

Figure 12:
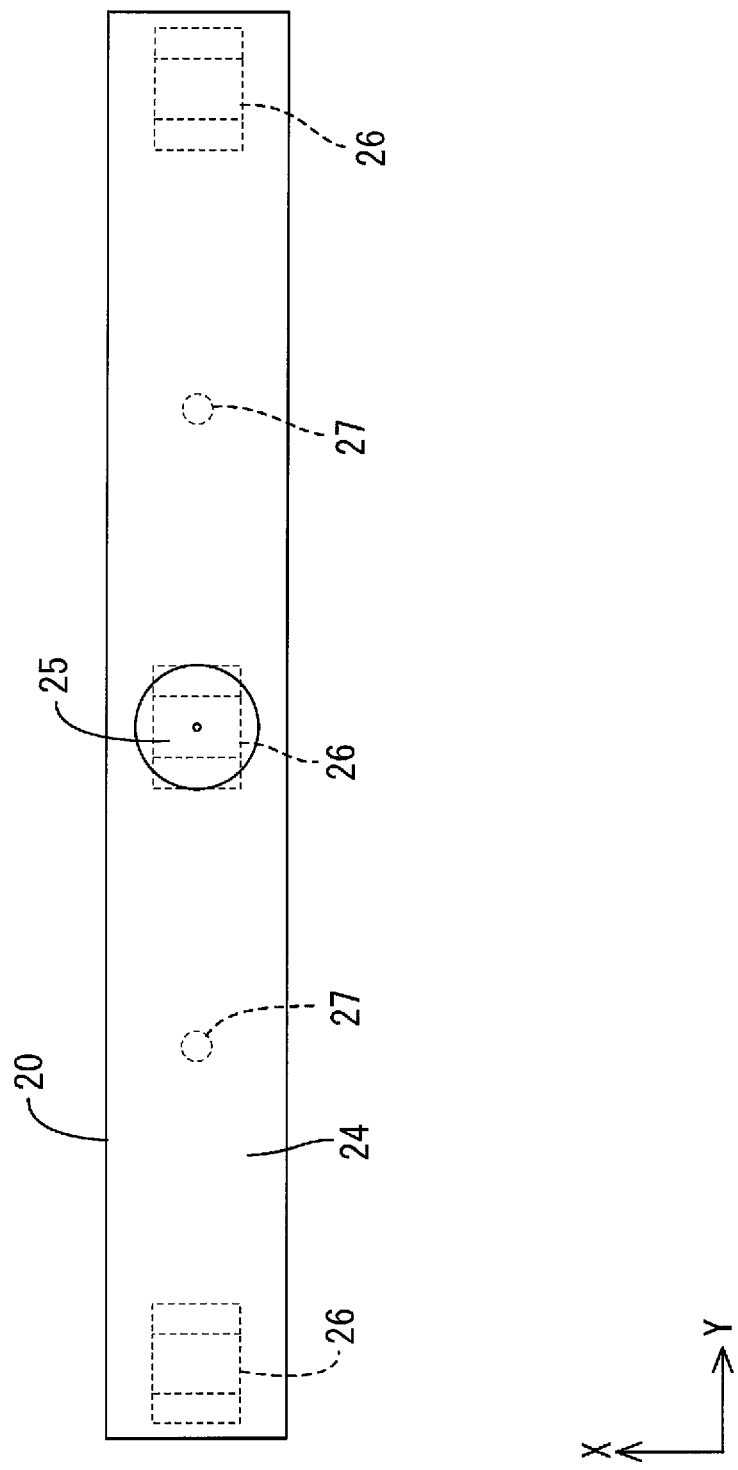
FIG. 12 is a plan view of the holding member.
Figure 13:
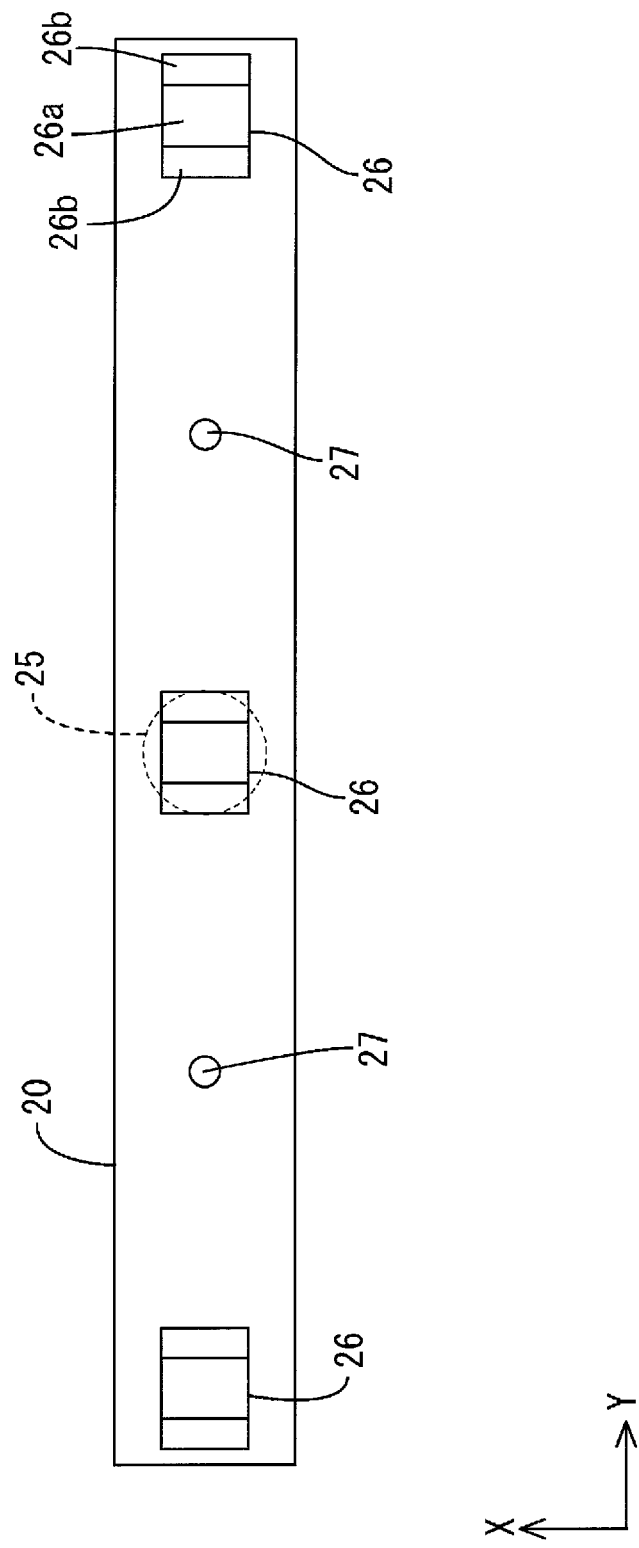
FIG. 13 is a bottom view of the holding member.

As shown in FIGS. 12 and 13, the body portion 24 is rectangular in a plan view, and is shaped like a plate extending in the X-axis direction and the Y-axis direction. As shown in FIG. 6, long-side dimension of the body portion 24 is set to be larger than short-side dimension of the LED board 18, and an interval (arrangement pitch) between the LED boards 18 arranged in parallel in the Y-axis direction in the chassis 14.

Therefore, when the body portion 24 is arranged in the chassis 14 in the state where the long-side direction aligns with the Y-axis direction, at least a part of the body portion 24 overlaps with the LED board 18 in a plan view. Since the body portion 24 is attached, with the LED board 18 and each of reflection sheets 22 and 23 being previously arranged in the chassis 14, the LED board 18 and each of reflection sheets 22,23 can be held together between the above-mentioned overlapping part in the body portion 24 and the bottom plate 14a of the chassis 14 (FIGS. 7 and 9). Hereinafter, a part of the body portion 24, which overlaps with the LED board 18 in a plan view and sandwiches LED board 18 between the part and the bottom plate 14a, is referred to as a sandwiching portion 24a.

Describing in detail, as shown in FIGS. 6 and 9, the body portion 24 has a dimension so that the long-side dimension covers the plurality of LED boards 18 arranged in parallel in the Y-axis direction in the chassis 14. Accordingly, the body portion 24 can cross over (traverse) the plurality of LED boards 18 arranged in parallel in the Y-axis direction along the Y-axis direction (short-side direction of the LED board 18), thereby sandwiching each of the plurality of LED boards 18 over the entire length in the short-side direction. In other words, it can be said that the body portion 24 includes the plurality of sandwiching portions 24a, and each of the sandwiching portions 24a are separated from each other in the Y-axis direction as the parallel arrangement direction of the LED boards 18. Specifically, the long-side dimension of the body portion 24 is set to be a sum of twice of the short-side dimension of the LED board 18 and three times of the interval between the LED boards 18 aligned in the Y-axis direction in the chassis 14, resulting in that the body portion 24 can cross over the two LED boards 18 in the short-side direction and sandwich the LED boards 18 between the body portion 24 and the bottom plate 14a. That is, the body portion 24 consists of two sandwiching portions 24a separated from each other in the Y-axis direction, a coupling portion 24b coupling the both sandwiching portions 24a to each other and two extending portions 24c extending from both the sandwiching portions 24a to the side opposite to the coupling portion 24b in the Y-axis direction.

The body portion 24 has a board contact portion 27 that protrudes toward the LED board 18 and is in contact with the LED board 18 in an overlapping area where the LED board 18 overlaps in a plan view, that is, the sandwiching portion 24a. The board contact portion 27 is located substantially at the center of each sandwiching portion 24a in the X-axis direction and the Y-axis direction. Accordingly, the LED board 18 is pressed substantially at the center in the short-side direction by the board contact portion 27. As shown in FIGS. 7 and 9, each of the reflection sheets 22 and 23 arranged between the body portion 24 and the LED board 18 has positions overlapping the board contact portion 27 in a plan view. In the overlapping areas, board contact portion insertion holes 22d and 23c are provided. The board contact portion 27 is passed through the board contact portion insertion holes 22d and 23c. Accordingly, the board contact portion 27 can directly press the LED board 18 by passing through the board contact portion insertion holes 22d and 23c and therefore, unsteadiness of the LED board 18 is hard to occur. In response to this, since it is prevented that stress from the board contact portion 27 directly acts on each of the reflection sheets 22 and 23, expansion or contraction of each of the reflection sheets 22 and 23 due to thermal expansion or thermal contraction is easily allowed. The protruding dimension of the board contact portion 27 from the body portion 24 is set to be almost equal to a sum of thicknesses of the reflection sheets 22 and 23.

As shown in FIGS. 6 and 7, the short-side dimension of the body portion 24 is set to be smaller than the interval (arrangement pitch) between the adjacent diffuser lenses 19 (LEDs 17). As a result, the body portion 24 is arranged passing the area between the adjacent diffuser lenses 19 (LEDs 17) on the LED board 18, that is, a non-light emitting part of the LED board 18 and thus, does not overlap with the LED 17 in a plan view. That is, it is prevented that the body portion 24 blocks light emission from the LED 17. In this embodiment, since the interval between the LEDs 17 is made sufficiently large by using the diffuser lenses 19 as described above, the holding member 20 can be arranged in the space and fix the LED board 18.

As shown in FIG. 3, the holding members 20 each having the body portion 24 of the above-mentioned configuration are arranged in the vicinity of both ends in the long-side direction of the LED board 18, that is, two positions separated from each other in the long-side direction (X-axis direction). Thereby, the LED board 18 is fixed stably in the vicinity of the both ends in the long-side direction in a balanced manner by the pair of holding members 20. Specifically, the interval between the pair of holding member 20 fixing one LED board 18 is set so that two or three diffuser lenses 19 (LEDs 17) are arranged between the pair of holding members 20. The holding member 20 in one row and the holding member 20 in the adjacent rows in the Y-axis direction are staggered in the X-axis direction so that one diffuser lens 19 (LED 17) is arranged between the holding members 20.

As shown in FIGS. 7 and 9, the supporting portion 25 protrudes from the front side surface (surface opposite to the optical member 15) of the body portion 24 toward the front side, and is conically shaped as a whole. Describing in detail, the supporting portion 25 is tapered so that its cross section taken along the plate surface of the body portion 24 is circular and becomes gradually smaller from a protruding bottom end toward a protruding front end. The supporting portion 25 is configured to contact with the diffuser plate 15a arranged closest to the backside (the LED 17 side) in the optical member 15, thereby supporting the diffuser plate 15a at a predetermined position. That is, the supporting portion 25 can restrict positional relationship between the optical member 15 and the LED 17 in the Z-axis direction (direction perpendicular to the surface of the optical member 15) to be constant. Since the plurality of holding members 20 each having the supporting portion 25 are distributed in the chassis 14, the optical member 15 can be properly supported without lack of balance in the plane (FIG. 3).

Specifically, as shown in FIGS. 6 and 12, the supporting portion 25 in this embodiment is located substantially at the center of the body portion 24 (coupling portion 24b). The outer diameter of the protruding bottom end of the supporting portion 25 is set to be smaller than both the short-side dimension of the body portion 24 and the short-side dimension of the LED board 18. That is, the supporting portion 25 is point in a plan view, while the body portion 24 is planar covering a wider range than the supporting portion 25 in a plan view. As shown in FIGS. 7 and 9, the protrusion dimension of the supporting portion 25 is almost equal to a distance between the front side surface of the body portion 24 to the back side surface of the diffuser plate 15a extending in the X-axis direction and the Y-axis direction substantially straightforward. Accordingly, the supporting portion 25 is in contact with the substantially straight diffuser plate 15a. The protruding front end of the supporting portion 25 as a contact part with the diffuser plate 15a is rounded. Since the supporting portion 25 is an only portion of the holding member 20, which protrudes from the body portion 24 toward the front side, in attaching the holding member 20 to the chassis 14, the operator can use the supporting portion 25 as an operating portion. As a result, workability in attaching or detaching the holding member 20 can be improved.

As shown in FIG. 9, the fixed portion 26 includes a bottom portion 26a protruding from the back side surface (surface opposite to the chassis 14) of the body portion 24 toward the back side, and a pair of elastic engaging pieces 26b folded from a front end of the bottom portion 26a to the body portion 24 side. The bottom portion 26a is substantially block-like and as shown in FIG. 13, is shaped like an oblong rectangle extending in the short-side direction (X-axis direction) of the body portion 24 in a plan view. Both the elastic engaging pieces 26b are cantilevered to be coupled to both side surfaces on the long side at a front end of the bottom portion 26a, and can be elastically deformed using the coupling sites as fulcrums in the direction of attaching or detaching to/from the bottom portion 26a (Y-axis direction). As shown in FIG. 9, the fixed portion 26 is configured to engage with the bottom plate 14a through the attachment hole 14e formed corresponding to the attachment position of the holding member 20 on the bottom plate 14a of the chassis 14. Describing in detail, when the fixed portion 26 is inserted into the attachment hole 14e formed so as to penetrate the bottom plate 14a, the both elastic engaging pieces 26b pass through the attachment hole 14e and then, are elastically engaged with an edge of the back side of the attachment hole 14e. Thereby, the holding member 20 can be fixedly attached to the chassis 14.

The fixed portions 26 are linearly arranged in parallel in the long-side direction of the body portion 24. Each fixed portion 26 is located in the body portion 24 away from each sandwiching portion 24a sandwiching each LED board 18 between the sandwiching portion 24a and the chassis 14. Specifically, three fixed portions 26 in total are provided at each central coupling portion 24b in the long-side direction and at each extending portions 24c located at both ends in the long-side direction in the body portion 24, and an interval corresponding to about the short-side dimension of the LED board 18 and the board positioning portion 14f is generated between the fixed portions 26. That is, the coupling portion 24b and the both extending portions 24c as areas except for the sandwiching portions 24a in the body portion 24 can be said as a fixed portion arrangement area where the fixed portion 26 is arranged. The coupling portion 24b and the both extending portions 24c, which constitute the fixed portion arrangement area, do not overlap with the LED board 18 in a plan view in the body portion 24. The fixed portions 26 are arranged so as to sandwich each sandwiching portion 24a (the LED board 18 and the board positioning portion 14f) therebetween in the Y-axis direction in the body portion 24. Accordingly, it is no need to form a hole passing the fixed portion 26 therethrough in the LED board 18. The interval between the fixed portions 26 is set to be slightly larger than the short-side dimension of the LED board 18. The attachment hole 14e that passes each fixed portion 26 therethrough is located away from each board positioning portion 14f in the bottom plate 14a of the chassis 14 (at a non-overlapping position in a plan view). Specifically, the three attachment holes 14e are arranged in parallel at the attachment positions of the holding members 20 in the Y-axis direction in the bottom plate 14a of the chassis 14, and the interval between the attachment holes 14e substantially corresponds to the interval between the fixed portions 26. As shown in FIGS. 7 and 9, the first reflection sheet 22 is sandwiched between the body portion 24 and the bottom plate 14a of the chassis 14. The first reflection sheet 22 has a communicating hole 22c that communicates with the attachment hole 14e and is configured to pass the fixed portion 26 therethrough in an overlapping area where the attachment hole 14e overlaps in a plan view.

As shown in FIGS. 12 and 13, of the fixed portions 26, the fixed portion 26 arranged at the center of the body portion 24 is arranged so as to overlap with the supporting portion 25 arranged on the front side in a plan view. Describing in more detail, the central fixed portion 26 and the supporting portion 25 are arranged so as to be substantially concentric with each other in a plan view. With such arrangement, in attaching the holding member 20 to the chassis 14, when the operator uses the supporting portion 25 as the operating portion, the operator can easily recognize the position of the fixed portion 26 hidden on the back side by viewing the supporting portion 25 exposed on the front side. Therefore, workability in inserting the fixed portion 26 into the communicating holes 22c, and the through hole 18b and the attachment hole 14e can be improved.

This embodiment has the above-mentioned configuration, and its action will be described. The liquid crystal display device 10 shown in FIGS. 4 and 5 is manufactured by separately manufacturing the liquid crystal panel 11 and the backlight unit 12 and assembling them by use of the bezel 13 or the like. Especially, the assembling operation in manufacturing the backlight unit 12 will be described in detail.

In this embodiment, prior to assembling of each component to the chassis 14, LEDs 17, the second reflection sheet 23 and the diffuser lenses 19 are attached to the LED board 18. Describing in detail, first, as shown in FIG. 10, after the LEDs 17 are mounted at predetermined positions on the LED board 18, the second reflection sheet 23 is attached to cover the front side. At this time, the LEDs 17 on the second reflection sheet 23 are inserted into the respective LED insertion holes 23a in the LED board 18. After that, as shown in FIG. 11, the diffuser lenses 19 are attached to the LED board 18 so as to cover the respective LEDs 17. At this time, the attachment shaft portions 19d of the diffuser lenses 19 are fixedly adhered to the LED board 18 with an adhesive through the respective shaft portion insertion holes 23b in the second reflection sheet 23. In this manner, a so-called light source unit U formed by uniting the LEDs 17, the second reflection sheet 23 and the diffuser lenses 19 is manufactured on the LED board 18.

Subsequently, an assembling operation of each component to the chassis 14 will be described. First, the light source units U are stored from the front side of the chassis 14 through the openings 14b and are arranged at predetermined attachment positions on the bottom plate 14a. In arranging the LED board 18, the LED board 18 is stored in the board storing space BS of each board positioning portion 14f provided at the attachment position of the bottom plate 14a. Then, since the outer edge of the LED board 18 is wholly applied to (in contact with) the side wall parts 14f1 and 14f2 of the board positioning portion 14f, the LED board 18 is correctly positioned with respect to the chassis 14 in the X-axis direction and the Y-axis direction in a two-dimensional way. At this time, since the second reflection sheet 23 together with the LED board 18 is also entirely stored in the board storing space BS, a step between the second reflection sheet 23 and the bottom plate 14a is hardly generated. The adjacent LED boards 18 in the X-axis direction are electrically connected to each other by engaging adjacent connector portions 18a to each other. The operation of connecting the LED boards 18 aligned in the X-axis direction to each other is not necessarily performed within the chassis 14, and may be performed outside of the chassis 14.

Figure 14:
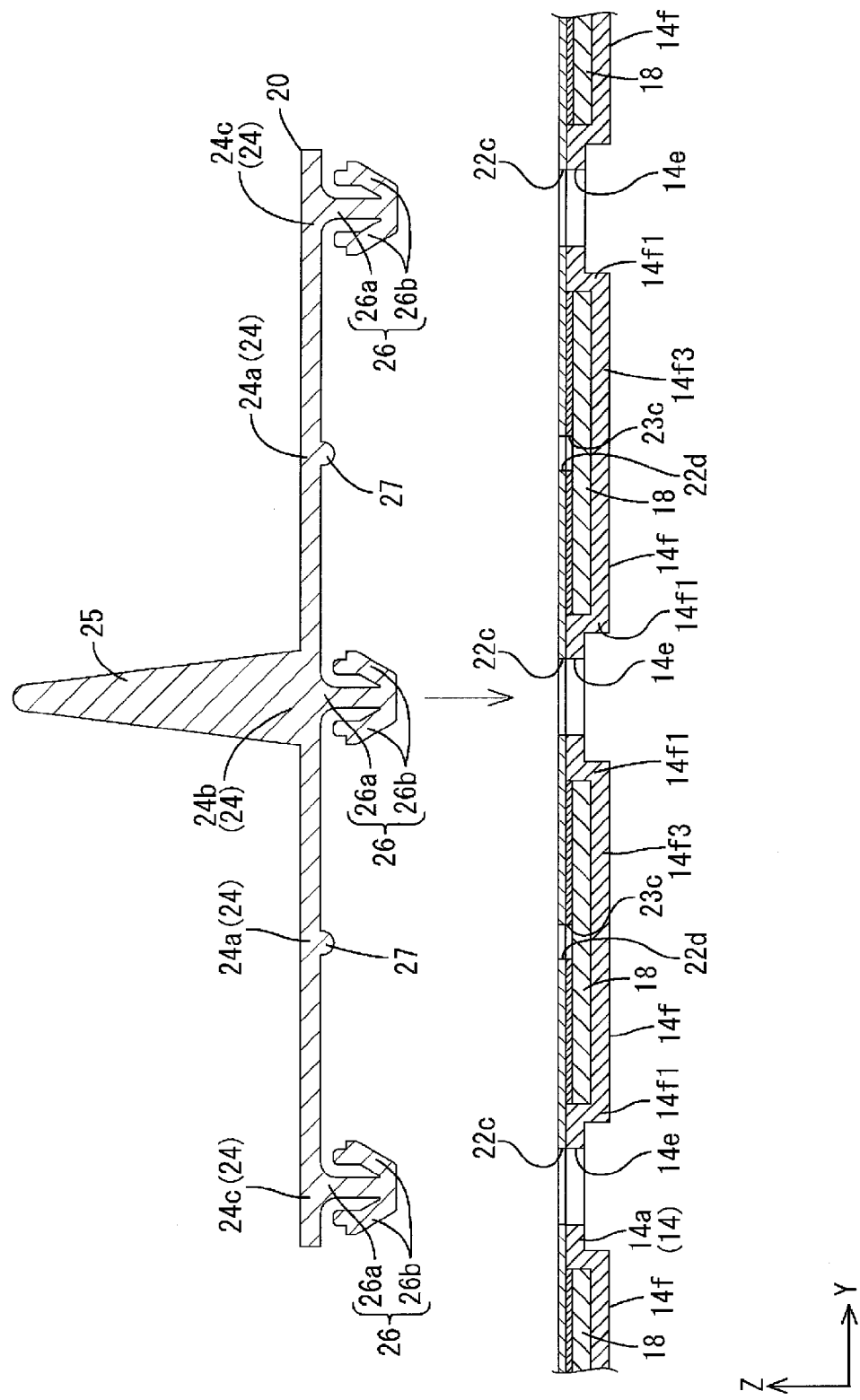
FIG. 14 is a sectional view taken along line ix-ix in FIG. 6 which shows the state before the holding member is attached to the chassis.

When arrangement of all of the light source units U is completed, an operation of arranging the first reflection sheet 22 in the chassis 14 is performed. At this time, each diffuser lens 19 is inserted into each lens insertion hole 22b while positioning each lens insertion hole 22b of the first reflection sheet 22 with respect to each diffuser lens 19 in the light source unit U (FIG. 3). When the first reflection sheet 22 is attached, the first reflection sheet 22 is placed from the front side onto almost all portions of the second reflection sheet 23 other than the overlapping portion with the diffuser lens 19 in a plan view (FIGS. 7 and 8). Especially, the edge of the lens insertion hole 22b of the first reflection sheet 22 is entirely placed on the front side of the second reflection sheet 23. As shown in FIG. 14, the communicating hole 22c of the first reflection sheet 22 is aligned with the attachment hole 14e of the chassis 14 and the board contact portion insertion hole 22d is matched with the board contact portion insertion hole 23c of the second reflection sheet 23 to be communicated with each other. After that, the operation of assembling the holding member 20 is performed.

In assembling the holding member 20 to the chassis 14, the operator can use the supporting portion 25 protruded toward the front side in the holding member 20 as the operating portion. That is, in the state shown in FIG. 14, the operator can operate the holding member 20 while gripping the supporting portion 25, and store the holding member 20 from the front side of the chassis 14 through the opening 14b, and insert each fixed portion 26 hidden on the back side into the corresponding communicating hole 22c and attachment hole 14e while the body portion 24 while keeping the state where the long-side direction of the body portion 24 matches the Y-axis direction and the short-side direction of the body portion 24 matches X-axis direction. At this time, since the supporting portion 25 and the central fixed portion 26 of the body portion 24 are arranged so as to overlap with each other in a plan view and are concentric with each other, the operator can easily recognize the position of at least the central fixed portion 26. Accordingly, each fixed portion 26 can be smoothly inserted into each of the holes 14e and 22c.

During the course of inserting the fixed portion 26 into each of the holes 14e and 22c, the both elastic engaging pieces 26b are elastically deformed once so as to get close to the bottom portion 26a (become hollowed). After that, when the fixed portion 26 is inserted such that the both elastic engaging pieces 26b reach the back side of the chassis 14, as shown in FIGS. 7 and 9, the both elastic engaging pieces 26b elastically return and their front ends are engaged with the edge of the attachment hole 14e from the back side. In this manner, the holding member 20 is prevented from being escaped from the chassis 14 and is fixed to the attached state. In this state, the LED board 18 and each of the reflection sheets 22 and 23 are sandwiched between the body portion 24 (the coupling portion 24b and the extending portions 24c) of the holding member 20 and the bottom plate 14a of the chassis 14 (bottom wall part 14f3).

Since the body portion 24 has a predetermined width in the X-axis direction, extends in the Y-axis direction and presses the LED board 18 in the short-side direction over entire length from the front side, the pressed area of the LED board 18 can be sufficiently ensured, thereby stably fixing the LED board 18. Moreover, as described above, since the LED board 18 is positioned in the X-axis direction and the Y-axis direction by the board positioning portion 14f, workability in attaching the holding member 20 is excellent and the attached holding member 20 is prevented from carelessly moving in these directions and is therefore stably held. Furthermore, since the board contact portion 27 provided at the holding member 20 is in direct contact with the LED board 18 through the board contact portion insertion holes 22d and 23c of the reflection sheets 22 and 23, the LED board 18 can be stably held without unsteadiness. Moreover, since fixation is achieved by mechanically engaging the fixed portion 26 with the attachment hole 14e formed in the chassis 14 through the attachment hole 14e, as compared to the case of adopting the fixing means such as the adhesive, fixation can be easily achieved at lower costs and the holding member 20 can be easily detached at maintenance and disposal. Since each of the reflection sheets 22 and 23 are sandwiched between the body portion 24 and the LED board 18, positioning and fixation of the reflection sheets 22 and 23 can be achieved at the same time.

As shown in FIG. 3, the pair of holding members 20 are attached in the vicinity of both ends of each LED board 18 in the long-side direction. Accordingly, each LED board 18 is fixed stably at two positions near the both ends in the long-side direction. Moreover, as shown in FIGS. 6 and 9, since the body portion 24 of each holding member 20 crosses over the two LED boards 18 and fixes the two LED boards 18 together, as compared to the case where the holding member independently fixes the LED boards 18, the number of holding members 20 and man hours for assembling can be reduced, thereby cutting costs and improving working efficiency. As shown in FIG. 7, since the body portion 24 of the holding member 20 is arranged so as to pass between the adjacent LEDs 17 (diffuser lenses 19) on the LED board 18, it is prevented that light emitted from the LEDs 17 is blocked.

After that, the optical member 15 is attached to the chassis 14 so as to cover the openings 14b. According to the specific attaching order of the optical member 15, the diffuser 15a, and then, the optical sheets 15b are attached. As shown in FIGS. 4 and 5, the outer edge of the optical member 15 is received by a receiving plate 14d of the chassis 14 and the central part of the optical member is supported by the supporting portion 25 of each holding member 20. Then, when the frame 16 is attached to the chassis 14, the outer circumference of the optical member 15 is pinched between the frame 16 and the receiving plates 14d. Thereby, manufacturing of the backlight unit 12 is completed. In assembling the manufactured backlight unit 12 and the liquid crystal panel 11, the liquid crystal panel 11 is placed on the frame 16 and then, the bezel 13 is covered on the front side, and they are screwed together. Thereby, the liquid crystal panel 11 is pinched between the frame 16 and the bezel 13 and becomes integral with the backlight unit 12, resulting in that manufacturing of the liquid crystal display device 10 is completed.

In using the liquid crystal display device 10 manufactured as described above, each of the LEDs 17 provided in the backlight unit 12 is lit and an image signal is supplied to the liquid crystal panel 11, thereby displacing a predetermined image on a display screen of the liquid crystal panel 11. As shown in FIGS. 7 and 8, light emitted to light each of the LEDs 17 is first incident on the light incidence surface 19a of the diffuser lens 19. At this time, most of the light is incident on an inclined surface of the light incidence-side concave portion 19c of the light incidence surface 19a and thus, into the diffuser lens 19 while being refracted with a wide angle according to the inclined angle. Then, the incident light propagates in the diffuser lens 19 and is emitted from the light emitting surface 19b. However, since the light emitting surface 19b is a substantially flat spherical surface, light is emitted while being further refracted at a boundary with the external air layer with a wider angle. Moreover, since the substantially bowl-like light-emitting side concave portion 19e is formed in an area where the amount of light from the LED 17 is the largest in the light emitting surface 19b, and its circumferential surface is a substantially flat spherical surface, light can be emitted while being refracted at the circumferential surface of the light-emitting side concave portion 19e with a wide angle, or can be reflected toward the LED board 18. Since light returned to the LED board 18 is reflected toward the diffuser lens 19 by the second reflection sheet 23 and is incident on the diffuser lens 19 once, high brightness can be obtained.

Since the highly directive light emitted from the LED 17 can be diffused with a wide angle by the diffuser lens 19, in-plane distribution of the light reaching the optical member 15 can be made uniform. In other words, since the area between the adjacent LEDs 17 becomes hard to be visually recognized as the dark place by using the diffuser lens 19, the interval between the LEDs 17 can be increased, thereby reducing the number of installed LEDs 17 while suppressing uneven brightness. Since the interval between the adjacent LEDs 17 can be increased by reducing the number of LEDs 17, the holding member 20 can be arranged in the widened area and further, the holding member 20 can fix the LED board 18.

Each LED 17 generates heat with lighting. Most of the heat generated from each LED 17 propagates to the chassis 14 through the LED board 18 that mounts the LED 17 thereon and is dissipated to air outside of the liquid crystal display device 10. Considering heat radiation efficiency at this time, as closeness between the LED board 18 and the chassis 14 is higher, heat transfer performances of the LED board 18 and the chassis 14 improve and heat radiation efficiency becomes higher. Conversely, closeness between the LED board 18 and the chassis 14 is lower, heat transfer performances of the LED board 18 and the chassis 14 lower and heat radiation efficiency becomes lower. In this embodiment, heat radiation efficiency is improved by fixing the LED board 18 to the chassis 14 by the holding member 20 and adopting following configuration. In other words, since the LED board 18 is planarly pressed over the entire length in the short-side direction by the sandwiching portion 24a of the body portion 24 to ensure a sufficiently large pressed area, the LED board 18 is stably held by the chassis 14 in intimate contact with the chassis 14. Moreover, since the LED board 18 is positioned in the X-axis direction and the Y-axis direction by the board positioning portion 14f as described above, the intimate contact state is preferably kept. Furthermore, the LED board 18 is directly pressed by the board contact portion 27 not via the reflection sheets 22 and 23, thereby preventing unsteadiness and keeping the intimate contact state more preferably. Moreover, since the LED board 18 is fixed in the vicinity of the both ends in the long-side direction by the pair of holding members 20, the LED board 18 is stably held in the intimate contact state in a balanced manner. As described above, since the LED board 18 is fixed stably to the chassis 14 in the intimate contact state by the holding members 20, heat transfer property to the chassis 14 is extremely high and therefore, heat radiation can be efficiently achieved. Therefore, since temperature inside the backlight unit 12 is hard to become high, it is possible to prevent lowering of light emission efficiency of each LED 17 and to stably obtain high brightness.

In using the liquid crystal display device 10 as described above, since each of the LEDs 17 in the backlight unit 12 is lit on or off, internal temperature environment changes and thus, each component of the liquid crystal display device 10 may be thermally expanded or thermally contracted. Since among the components of the liquid crystal display device 10, the optical member 15 is a large synthetic resin part having a high thermal expansion coefficient, the amount of expansion or contraction of the optical member 15 due to thermal expansion or thermal contraction tends to become especially large. For this reason, the thermally expanded or contracted optical member 15 is easy to be subjected to deformation such as warpage or flexure. However, since the diffuser plate 15a of the optical member 15 is in contact with the supporting portion 25 of each of the holding members 20 distributed in the chassis 14, it is prevented that the optical member 15 is displaced so as to get closer to the LED 17. That is, since the supporting portion 25 restricts positional relationship between the optical member 15 and the LED 17 in the Z-axis direction to be constant, optical characteristics of light, which is emitted from the LED 17, enters into and is emitted from the optical member 15, can be kept constant. Thus, uneven brightness of light emitted from the backlight unit 12 and the liquid crystal display device 10 can be prevented.

As described above, the backlight unit 12 according to this embodiment includes the LED board 18 with the LED 17 as the light source, the chassis 14 that stores the LED board 18 therein and has the opening 14b that emits light from the LED 17 and the holding member 20 that extends in at least one direction along the plate surface of the LED board 18 and is fixed to the chassis 14 so as to sandwich the LED board 18 between the holding member 20 and the chassis 14.

With this configuration, when the holding member 20 is fixed to the chassis 14, the LED board 18 is held in the state of being sandwiched between the holding member 20 and the chassis 14. Since the LED board 18 is fixed by means of the holding member 20 extending in at least one direction along the plate surface of the LED board 18, as compared to the conventional case of using the point screw with respect to the plate surface of the LED board 18, the LED board 18 can be fixed stably by the small number of holding members 20 used. Since the number of holding member 20 used is small, the number of components and man hours for assembling can be reduced, thereby improving working efficiency. In addition, since the LED board 18 can be fixed stably, it is possible to stabilize optical characteristics of light that is generated from the LED 17 and emitted from the opening 14b of the chassis 14 as well as heat radiation property from the LED board 18 to the chassis 14.

The holding member 20 includes the body portion 24 that sandwiches the LED board 18 between the holding member 20 and the chassis 14 and the fixed portion 26 that protrudes from the body portion 24 toward the chassis 14 and is fixed to the chassis 14. With this configuration, by fixing the fixed portion 26 to the chassis 14, the LED board 18 sandwiched between the body portion 24 and the chassis 14 can be preferably fixed.

The fixed portion 26 is located at the body portion 24 so as not to overlap with the LED board 18 in a plan view. With this configuration, the fixed portion 26 can be fixed to the chassis 14 without passing through the LED board 18. Thus, since a hole passing the fixed portion 26 therethrough is not formed in the LED board 18, manufacturing costs of the LED board 18 can be reduced and circuit design is simplified.

The body portion 24 crosses over the LED board 18, and the pair of fixed portions 26 are provided so as to sandwich the LED board 18 therebetween in a plan view in the body portion 24. With this configuration, the body portion 24 crossing over the LED board 18 can stably fix the LED board 18. Moreover, by fixing the pair of fixed portions 26 to the chassis 14, the LED board 18 arranged between both the fixed portions 26 in a plan view can be fixed more stably.

The board contact portion 27 that protrudes toward the LED board 18 and is in direct contact with the LED board 18 is provided at the overlapping position with the LED board 18 in a plan view in the body portion 24. With this configuration, since the board contact portion 27 can press the LED board 18, unsteadiness of the LED board 18 due to dimensional tolerance is hard to occur and therefore, the LED board 18 can be fixed stably. Further, when the fixed portion 26 is fixed to the chassis 14 while bringing the board contact portion 27 into direct contact with the LED board 18, depending on the setting of the protruding dimension of the board contact portion 27, the body portion 24 can be elastically warped to the side opposite to the LED board 18 using the fixed portion 26 as the fulcrum. Accordingly, with this configuration, the LED board 18 can be brought into intimate contact with the chassis 14 by the elastic force of the warped body portion 24 and therefore, the LED board 18 can be fixed more stably.

The reflection sheet 21 (the first reflection sheet 22 and the second reflection sheet 23) that reflects light toward the opening 14b is arranged in the chassis 14, and the reflection sheet 21 has the lens insertion hole 22b and the LED insertion hole 23a that pass the LED 17 therethrough at the overlapping position with the LED 17 in a plan view, and the board contact portion insertion holes 22d and 23c that pass the board contact portion 27 therethrough at the overlapping position with the board contact portion 27 in a plan view, and is sandwiched between the body portion 24 and the LED board 18. With this configuration, light from the LED 17 can be efficiently reflected toward the opening 14b by the reflection sheet 21 and further, the holding member 20 can fix both the LED board 18 and the reflection sheet 21. Moreover, since the board contact portion 27 is inserted into the board contact portion insertion holes 22d and 23c of the reflection sheet 21, the LED board 18 can be directly pressed by the board contact portion 27 and therefore, unsteadiness of the LED board 18 can be prevented more effectively. Moreover, since it is prevented that stress from the board contact portion 27 directly acts on the reflection sheet 21, expansion or contraction of the reflection sheet 21 due to thermal expansion or thermal contraction is easily allowed. Thus, wrinkle or flexure of the reflection sheet 21 is hard to occur and therefore, unevenness of light reflected by the reflection sheet 21 is hard to occur.

The LED board 18 is rectangular in a plan view, and the body portion 24 extends in the short-side direction of the LED board 18. With this configuration, as compared to the case where the body portion extends in the long-side direction of the LED board 18, the holding member 20 can be reduced in size.

The body portion 24 crosses over the LED board 18. With this configuration, LED the board 18 can be fixed more stably.

The plurality of LED boards 18 are arranged in parallel with the chassis 14, and the body portion 24 extends over the plurality of LED boards 18. With this configuration, since one holding member 20 can fix the plurality of LED boards 18, the number of components can be preferably reduced.

The body portion 24 crosses over the plurality of LED boards 18. With this configuration, since the body portion 24 crosses over and sandwiches the plurality of LED boards 18 between the body portion 24 and the chassis 14, the plurality of LED boards 18 can be fixed more stably.

The plurality of LEDs 17 are arranged on the LED board 18 along the long-side direction. With this configuration, the plurality of LEDs 17 can be efficiently arranged on the LED board 18, which is preferable for higher brightness.

The body portion 24 is arranged so as to pass between the adjacent LEDs 17. With this configuration, space held between the adjacent LEDs 17 can be effectively used. Further, it can be prevented that body portion 24 blocks light generated from the LEDs 17.

The holding members 20 are arranged at two positions separated from each other in the long-side direction in the LED board 18. With this configuration, even the downsized holding member 20, in which the body portion 24 extends in the short-side direction of the LED board 18, can stably fix the LED board 18.

The chassis 14 is rectangular in a plan view, and the plurality of LED boards 18 are arranged in parallel so that its long-side direction aligns with the long-side direction of the chassis 14. With this configuration, as compared to the case where the plurality of LED boards 18 are arranged in parallel so that its long-side direction aligns with the short-side direction of the chassis 14, the number of the LED boards 18 arranged in the chassis 14 can be reduced. Accordingly, the number of lighting circuits necessary for lighting each LED 17 arranged in each LED board 18 can be reduced, which is suitable for cost reduction.

The fixed portion 26 passes through the chassis 14 and is engaged with the chassis 14 from the side opposite to the LED board 18. With this configuration, since the holding member 20 and the LED board 18 can be fixed by engaging the fixed portion 26 passing through the chassis 14, fixation can be easily achieved at low costs without requiring other fixing means such as adhesive.

The optical member 15 arranged as opposed to the LED board 18 so as to cover the opening 14b is provided, and the body portion 24 is provided with the supporting portion 25 that protrudes toward the optical member 15 and can support the optical member 15. With this configuration, the holding member 20 can have both the function of fixing the LED board 18 and the function of supporting the optical member 15.

The fixed portion 26 and the supporting portion 25 are located so as to overlap with each other in a plan view. With this configuration, when the operator attaches the holding member 20 while gripping the supporting portion 25, the position of the fixed portion 26 can be easily recognized, which is excellent in workability.

The fixed portion 26 and the supporting portion 25 are located so as to be concentric with each other. With this configuration, workability is more excellent.

The board positioning portion 14f configured to position the LED board 18 in the direction along the plate surface is provided in the chassis 14. With this configuration, when the LED board 18 is arranged in the chassis 14, the board positioning portion 14f can position the LED board 18 in the direction along the plate surface. Accordingly, workability in fixing the LED board 18 by the holding member 20 can be improved.

The board positioning portion 14f extends along the edge of the LED board 18. With this configuration, by arranging the board positioning portion 14f along the edge of the LED board 18, the LED board 18 can be positioned easily and properly.

The board positioning portion 14f is formed by partially protruding the chassis 14 to the side opposite to the opening 14b so as to ensure the board storing space BS that can store the LED board 18 from the opening 14b side. With this configuration, since the LED board 18 can be stored in the board storing space BS held by the board positioning portion 14f from the opening 14b side, the LED board 18 is recessed to the side opposite to the opening 14b by the depth of the board positioning portion 14f. Accordingly, due to the recessed portion, the light path length where light is emitted from the LED 17 and reaches the opening 14b can be ensured longer and therefore, evenness of light emitted from the opening 14b is hard to occur.

The first reflection sheet 22 that reflects light toward the opening 14b is arranged in the chassis 14, and the first reflection sheet 22 has the lens insertion hole 22b that passes the LED 17 therethrough at the overlapping position with the LED 17 in a plan view, is formed to be larger than the board positioning portion 14*f* in a plan view and is sandwiched between the body portion 24 and the LED board 18. With this configuration, the holding member 20 can fix both the LED board 18 and the first reflection sheet 22 and light from the LED 17 can be efficiently reflected toward the opening 14*b* by the first reflection sheet 22. Moreover, since the LED board 18 is recessed to the side opposite to the opening 14*b* by the depth of the board positioning portion 14*f*, the step that can be generated between the chassis 14 and the LED board 18 can be reduced. Accordingly, deformation such as warpage of the first reflection sheet 22 that is larger than the board positioning portion 14*f* in a plan view due to the step is hard to occur and therefore, unevenness of light reflected by the first reflection sheet 22 is hard to occur.

LED board 18 is rectangular in a plan view, and the board positioning portion 14*f* extends in the long-side direction of the LED board 18. With this configuration, the rectangular LED board 18 can be positioned more easily and properly.

The board positioning portion 14*f* can position the LED boards 18 in two directions that are along the plate surface and are perpendicular to each other. With this configuration, the LED boards 18 can be correctly positioned in a two-dimensional way.

The reflection sheet 21 that reflects light toward the opening 14*b* is arranged in the chassis 14, and the reflection sheet 21 is arranged closer to the opening 14*b* than the LED board 18, and has the lens insertion hole 22*b* and the LED insertion hole 23*a* that pass the LED 17 therethrough at the overlapping position with the LED 17 in a plan view. With this configuration, by reflecting light toward the opening 14*b* by the reflection sheet 21, the light can be effectively used, which is preferable to improvement of brightness. Since the reflection sheet 21 has the lens insertion hole 22*b* and the LED insertion hole 23*a*, light emission from the LED 17 is not blocked.

The diffuser lens 19 diffusing light from the LED 17 is arranged at the overlapping position with the LED 17 in a plan view on the opening 14*b* side in the LED board 18. With this configuration, light emitted from the LED 17 can be diffused by the diffuser lens 19 and then, guided to the opening 14*b*. As a result, unevenness of light emitted from the opening 14*b* is hard to occur.

The reflection sheet 21 consists of the first reflection sheet 22 including the lens insertion hole 22*b* that is configured to pass the diffuser lens 19 therethrough, and the second reflection sheet 23 that is arranged between the LED board 18 and the diffuser lens 19, is located so as to overlap with the lens insertion hole 22*b* provided in the first reflection sheet 22 in a plan view (arranged in the lens insertion hole 22*b* in a plan view) and reflects light toward the diffuser lens 19. With this configuration, even when the first reflection sheet 22 has the lens insertion hole 22*b* that is configured to pass the diffuser lens 19 therethrough, light can be reflected toward the diffuser lens 19 by the second reflection sheet 23 located so as to overlap with the lens insertion hole 22*b* (arranged in the lens insertion hole 22*b* in a plan view). As a result, light can be efficiently utilized, which is preferable for improvement of brightness.

The edge of the lens insertion hole 22*b* of the first reflection sheet 22 and the second reflection sheet 23 are formed so as to overlap with each other in a plan view. With this configuration, the edge of the lens insertion hole 22*b* of the first reflection sheet 22 and the second reflection sheet 23 are connected to each other in a plan view without any gap. Thus, light can be used more efficiently.

The reflection sheet 21 is sandwiched between the holding member 20 and the LED board 18. With this configuration, the holding member 20 can fix both the LED board 18 and the reflection sheet 21.

The light source is the LED 17. With this configuration, higher brightness and lower power consumption can be achieved.

Although the first embodiment of the present invention has been described, the present invention is not limited to this embodiment and for example, may include the following modification examples. In each of the following modification examples, the same members as those in the above-mentioned embodiment are given the same reference numerals and illustration and description thereof may be omitted.

<First Modification Example of First Embodiment>

A first modification example of the first embodiment will be described with reference to FIG. 15 or FIG. 16. Here, a board contact portion 27-1 having modified configuration in the holding member 20 is shown.

Figure 15:
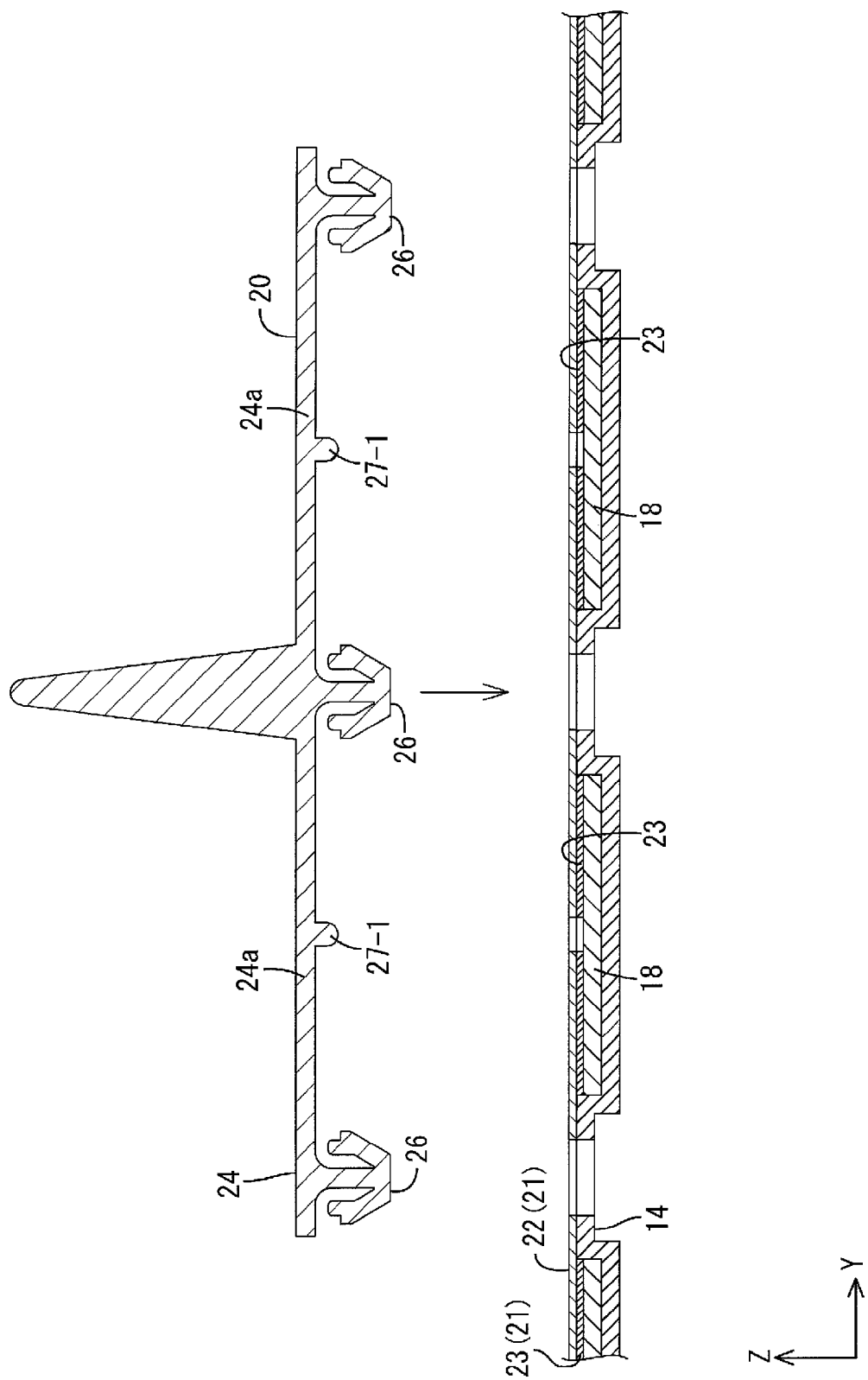
FIG. 15 is a sectional view showing the state before the holding member according to a first modification example of the first embodiment is attached to the chassis.
Figure 16:
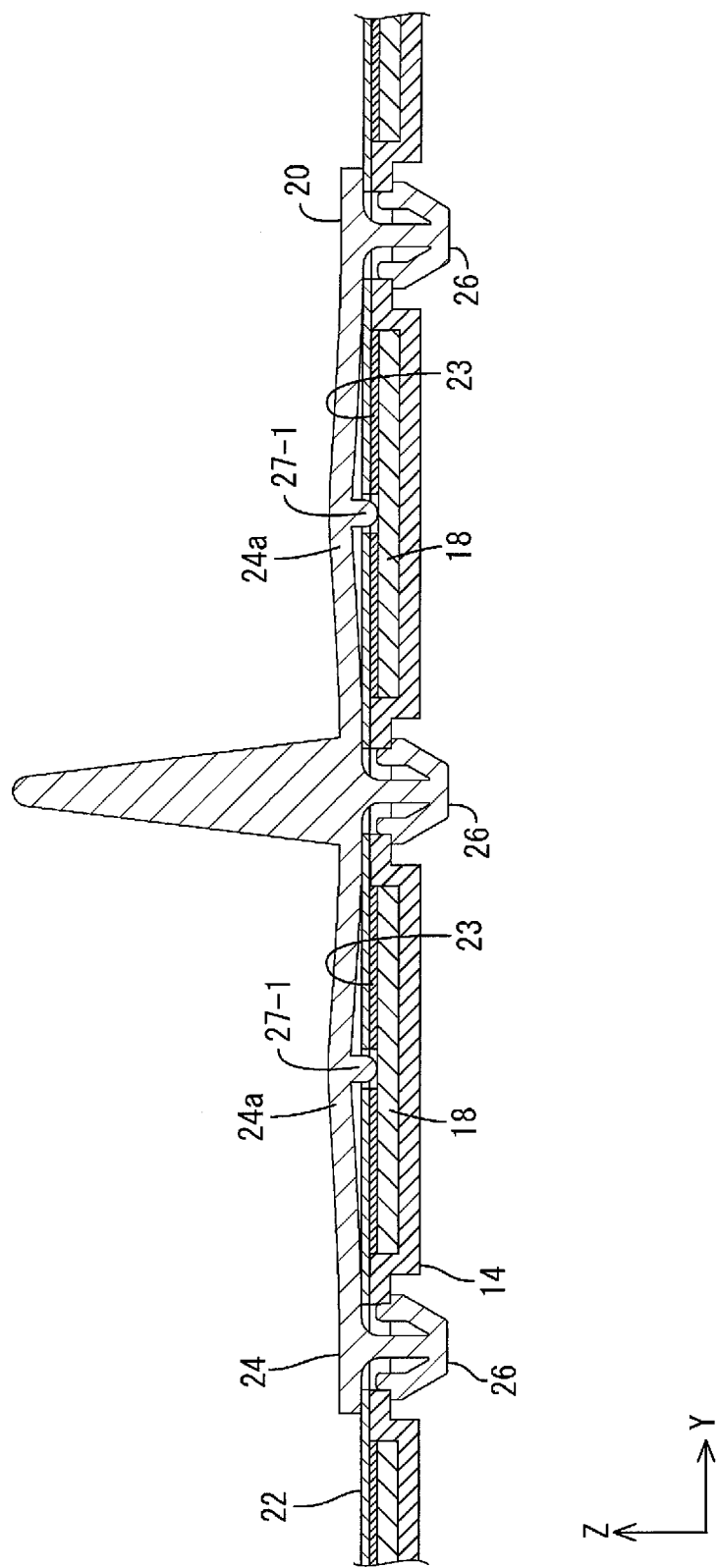
FIG. 16 is a sectional view showing the state where the holding member is attached to the chassis.

As shown in FIG. 15, the board contact portion 27-1 in this modification example has a larger protruding dimension from the body portion 24 than the board contact portion 27 described in the first embodiment. That is, the protruding dimension of the board contact portion 27-1 is set to be larger than a sum of thicknesses of both the reflection sheets 22 and 23 between the body portion 24 and the LED board 18. Accordingly, when the holding member 20 is attached to the chassis 14 in the state shown in FIG. 15, as shown in FIG. 16, first, each board contact portion 27-1 is in contact with each LED board 18 and then, each fixed portion 26 is engaged with the chassis 14. For this reason, each sandwiching portion 24*a* of the body portion 24 is elastically deformed in the shape of a bow so as to warp to the front side, that is, the side opposite to the LED board 18 using the fixed portion 26 sandwiching the LED board 18 in a plan view as the fulcrum. Accordingly, the LED board 18 can be brought into intimate contact with the chassis 14 by the elastic force of the warped sandwiching portions 24*a*. Thereby, the LED board 18 can be fixed to the chassis 14 more stably in the intimate contact state.

As described above, in this modification example, the protruding dimension of the board contact portion 27-1 from the body portion 24 is set to be larger than the thickness of the reflection sheet 21. With this configuration, the LED board 18 can be pressed by the board contact portion 27-1 more reliably and further, the body portion 24 can be elastically warped to the side opposite to the LED board 18 using the fixed portion 26 as the fulcrum, thereby elastically holding the LED board 18. As a result, unsteadiness of the LED board 18 can be prevented more effectively and the LED board 18 can be fixed stably.

<Second Modification Example of First Embodiment>

A second modification example of the first embodiment will be described with reference to FIG. 17. Here, a board contact portion 27-2 and a second reflection sheet 23-2 that have modified configuration in the holding member 20 are shown.

Figure 17:
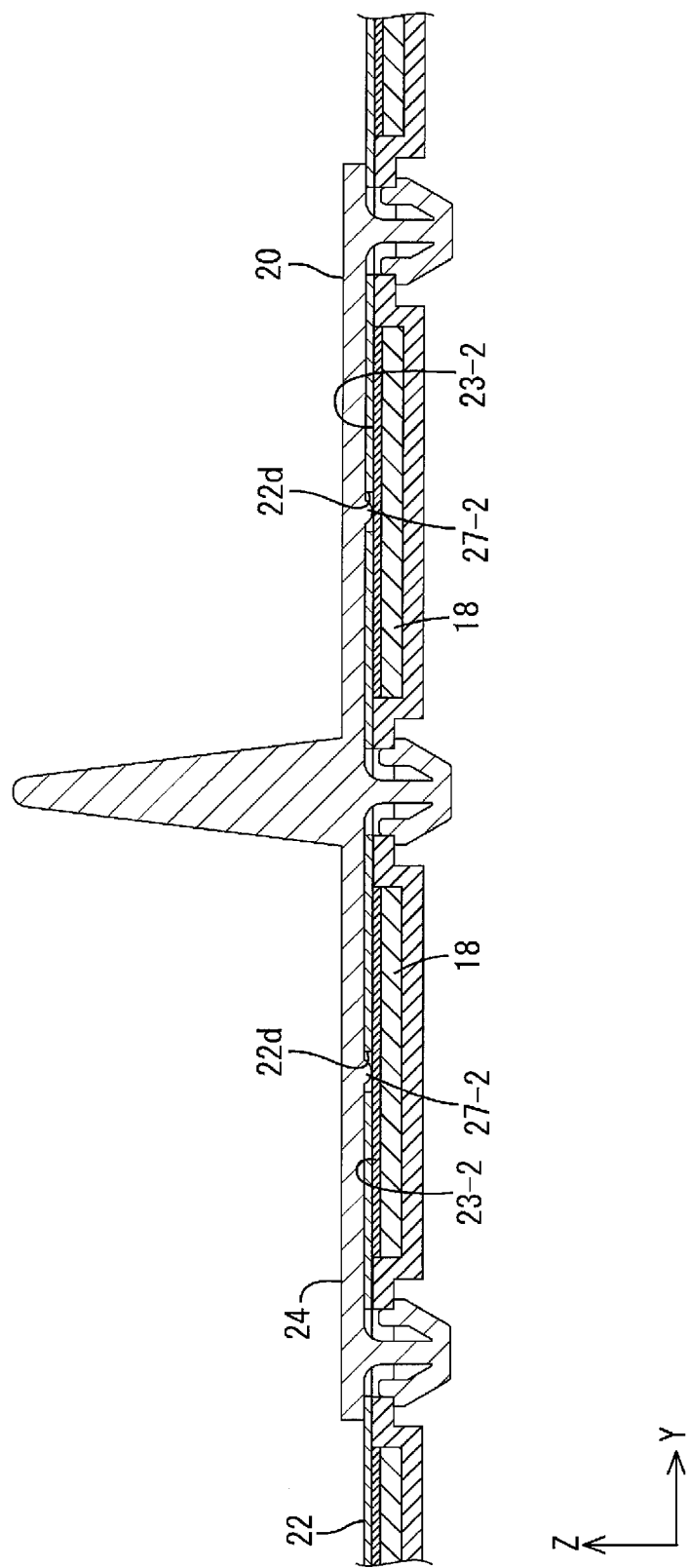
FIG. 17 is a sectional view showing the state where the holding member according to a second modification example of the first embodiment is attached to the chassis.

As shown in FIG. 17, the second reflection sheet 23-2 in this modification example does not have a board contact portion insertion hole passing the board contact portion 27-2 therethrough. The protruding dimension of the board contact portion 27-2 from the body portion 24 is substantially equal to the thickness of the first reflection sheet 22. Accordingly, the board contact portion 27-2 is in direct contact with the second reflection sheet 23-2 through the board contact portion insertion hole 22*d* of the first reflection sheet 22, but is not in direct contact with the LED board 18 and indirectly presses the LED board 18. Also with this configuration, unsteadiness of the LED board 18 can be suppressed. Although not shown, in this modification example, by setting the protruding dimension of the board contact portion 27-2 to be larger than the thickness of the first reflection sheet 22, as in the first modification example, the body portion 24 can be elastically warped to elastically hold the LED board 18.

<Third Modification Example of First Embodiment>

A third modification example in the first embodiment will be described with reference to FIG. 18 or FIG. 19. Here, a first reflection sheet 22-3 and a second reflection sheet 23-3 that have modified configuration are shown.

Figure 18:
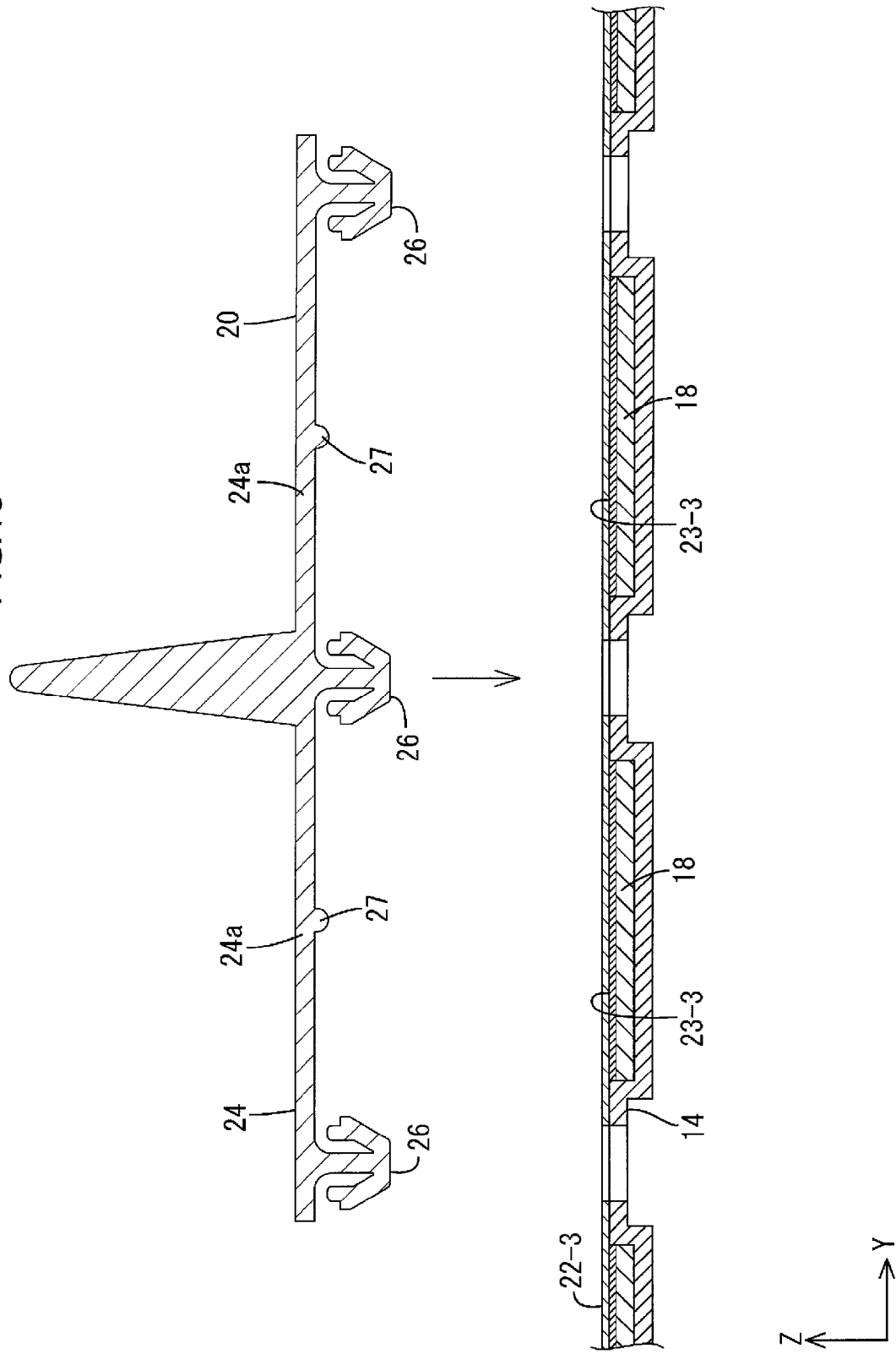
FIG. 18 is a sectional view showing the state where the holding member according to a third modification example of the first embodiment is attached to the chassis.
Figure 19:
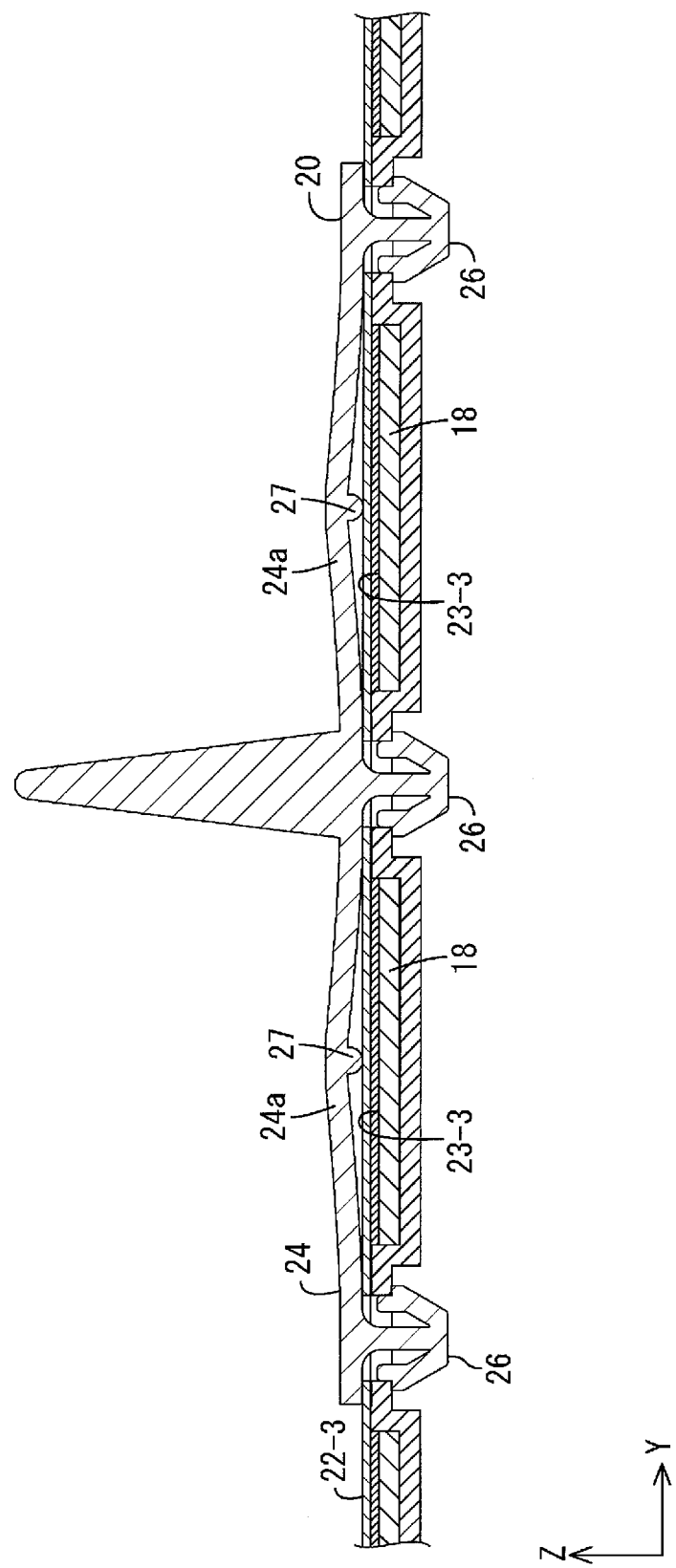
FIG. 19 is a sectional view showing the state where the holding member is attached to the chassis.

As shown in FIG. 18, both the first reflection sheet 22-3 and the second reflection sheet 23-3 in this modification example do not have a board contact portion insertion hole that pass the board contact portion 27 therethrough. Accordingly, the board contact portion 27 is in direct contact with the first reflection sheet 22-3, but is not in direct contact with the second reflection sheet 23-3 and the LED board 18 and indirectly presses the LED board 18 via both the reflection sheets 22-3, 23-3. Then, when the holding member 20 is attached to the chassis 14 in the state shown in FIG. 18, as shown in FIG. 19, each board contact portion 27 first contacts the first reflection sheet 22-3 and then, each fixed portion 26 is engaged with the chassis 14. For this reason, each sandwiching portion 24a of the body portion 24 is elastically deformed in the shape of a bow so as to warp to the front side, that is, the side opposite to the LED board 18 using each fixed portion 26 sandwiching the LED board 18 in a plan view. Accordingly, the LED board 18 can be brought into intimate contact with the chassis 14 by the elastic force of the warped sandwiching portions 24a. As a result, the LED board 18 can be fixed to the chassis 14 in the intimate contact state more stably.

<Fourth Modification Example of First Embodiment>

A fourth modification example of the first embodiment will be described with reference to FIG. 20. Here, an LED board 18-4, a diffuser lens 19-4 and a second reflection sheet 23-4 that have modified dimension are shown.

Figure 20:
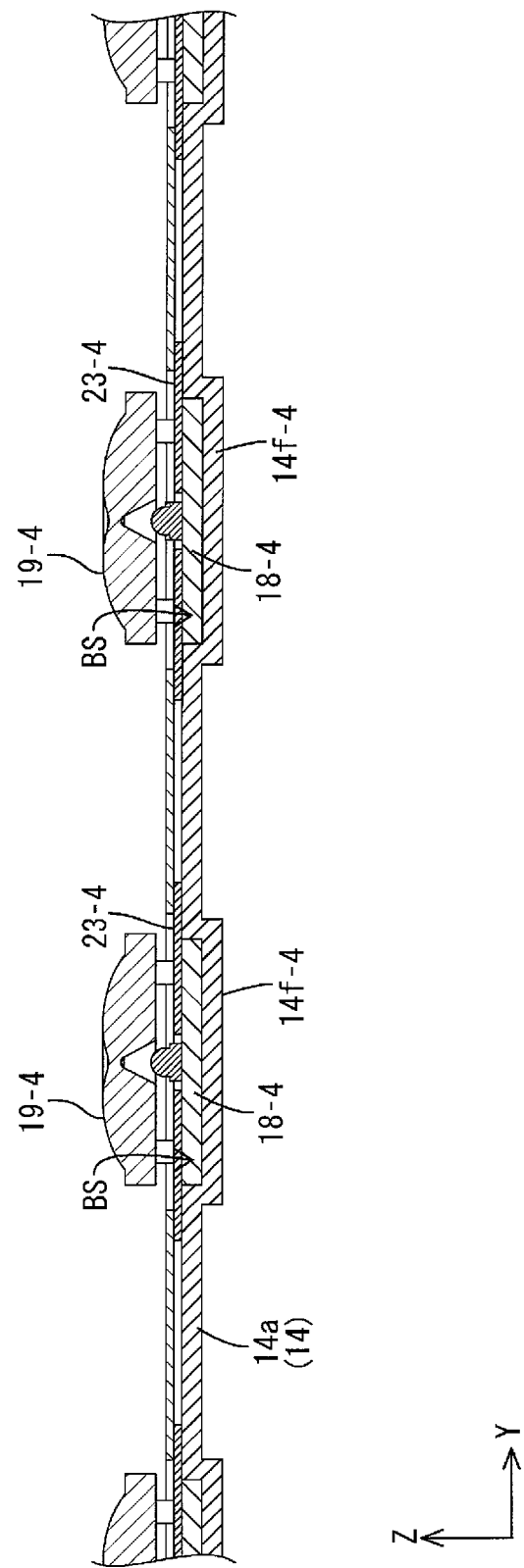
FIG. 20 is a sectional view showing relationship among the LED board, a diffuser lens, a board positioning portion and a second reflection sheet according to a fourth modification example of the first embodiment.

As shown in FIG. 20, the diameter of the diffuser lens 19-4 in this modification example is set to be almost equal to the short-side dimension of the LED board 18-4. On the contrary, the short-side dimension of the second reflection sheet 23-4 is set to be larger than the LED board 18-4. Further, a board positioning portion 14f-4 has the short-side dimension that is almost the same as the LED board 18-4 (including a clearance that allows storage) and the depth that is almost the same as the thickness of the LED board 18-4. Accordingly, the front side surface of the LED board 18-4 stored in the board storing space BS of the board positioning portion 14f-4 is substantially in flush with the bottom plate 14a of the chassis 14, generating no step between the front side surface and the bottom plate 14a. Accordingly, the second reflection sheet 23-4 crosses over the LED board 18-4 in the short-side direction (is larger than the LED board 18-4 and the board positioning portion 14f-4 in a plan view) and is placed on the bottom plate 14a of the chassis 14 from the front side, and deformation such as warpage is hard to occur.

As described above, in this modification example, the protruding dimension of the board positioning portion 14f-4 to the side opposite to the opening 14b of the chassis 14 is substantially equal to the thickness of the LED board 18-4. With this configuration, since the step that can be generated between the chassis 14 and the LED board 18-4 can be substantially eliminated, deformation of the second reflection sheet 23-4 due to the step can be prevented.

<Second Embodiment>

A second embodiment of the present invention will be described with reference to FIG. 21. In the second embodiment, a holding member 120 having modified configuration is shown. Overlapping description of the same configuration, functions and effects as those in the first embodiment is omitted.

Figure 21:
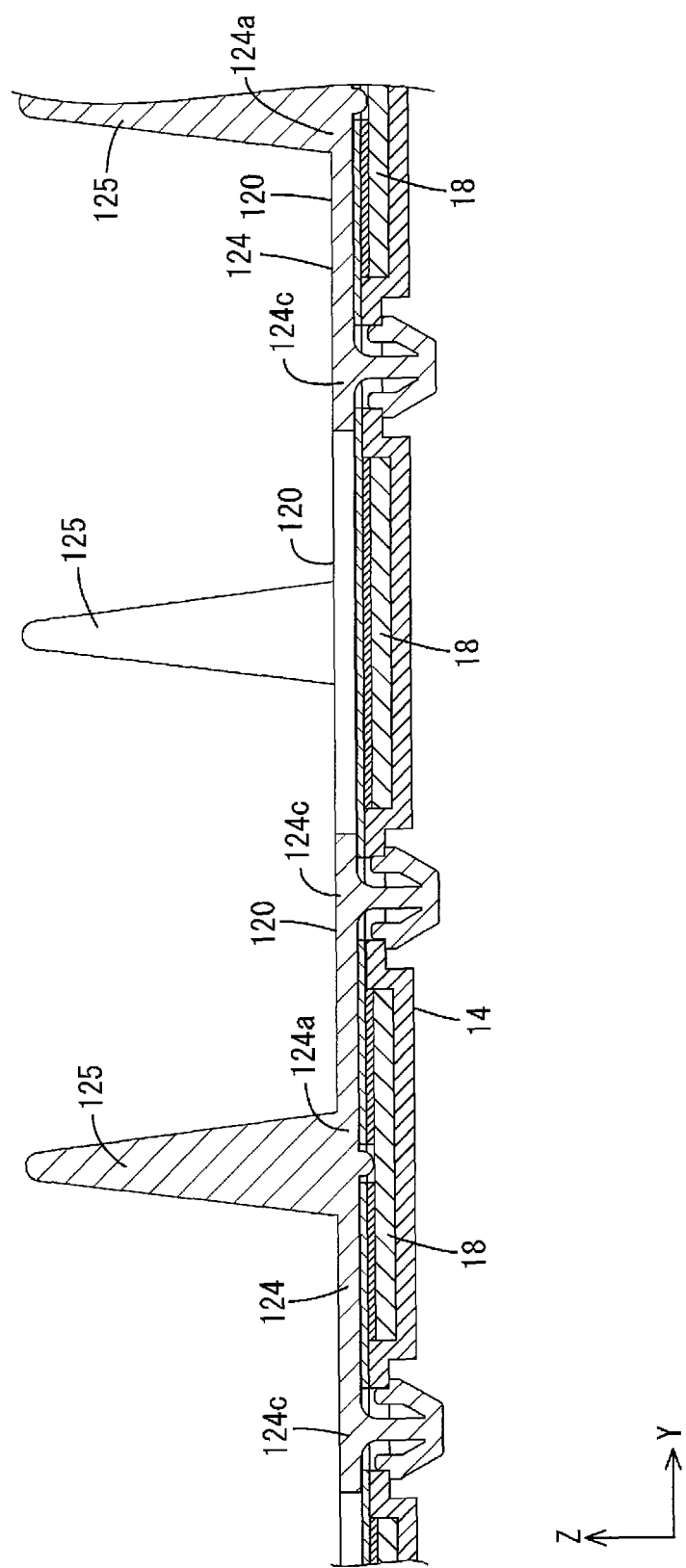
FIG. 21 is a sectional view showing the state where the holding member according to a second embodiment of the present invention is attached to the chassis.

As shown in FIG. 21, a body portion 124 of the holding member 120 consists of one sandwiching portion 124a that overlaps with the LED board 18 in a plan view and sandwiches the LED board 18 between the sandwiching portion 124a and the chassis 14, and a pair of extending parts 124c that extends from both ends in the Y-axis direction of the sandwiching portion 124a in the Y-axis direction. That is, the body portion 124 of the holding member 120 according to this embodiment configured to crosses over one LED board 18, but does not cross over the plurality of LED boards 18 arranged in parallel in the Y-axis direction and fixes each LED board 18 between the body portion 124 and the chassis 14. With this configuration, the degree of freedom in the attachment position of each holding member 120 (supporting portion 125) to the chassis 14 is improved and therefore, the optical member 15 can be supported more properly. As in the first embodiment, the holding members 120 are preferably arranged in the chassis 14 in a zigzag manner, thereby preventing interference between the adjacent holding members 120 in the Y-axis direction.

<Third Embodiment>

A third embodiment of the present invention will be described with reference to FIG. 22. In the third embodiment, a holding member 220 having modified configuration is shown. Overlapping description of the same configuration, functions and effects as those in the first embodiment is omitted.

Figure 22:
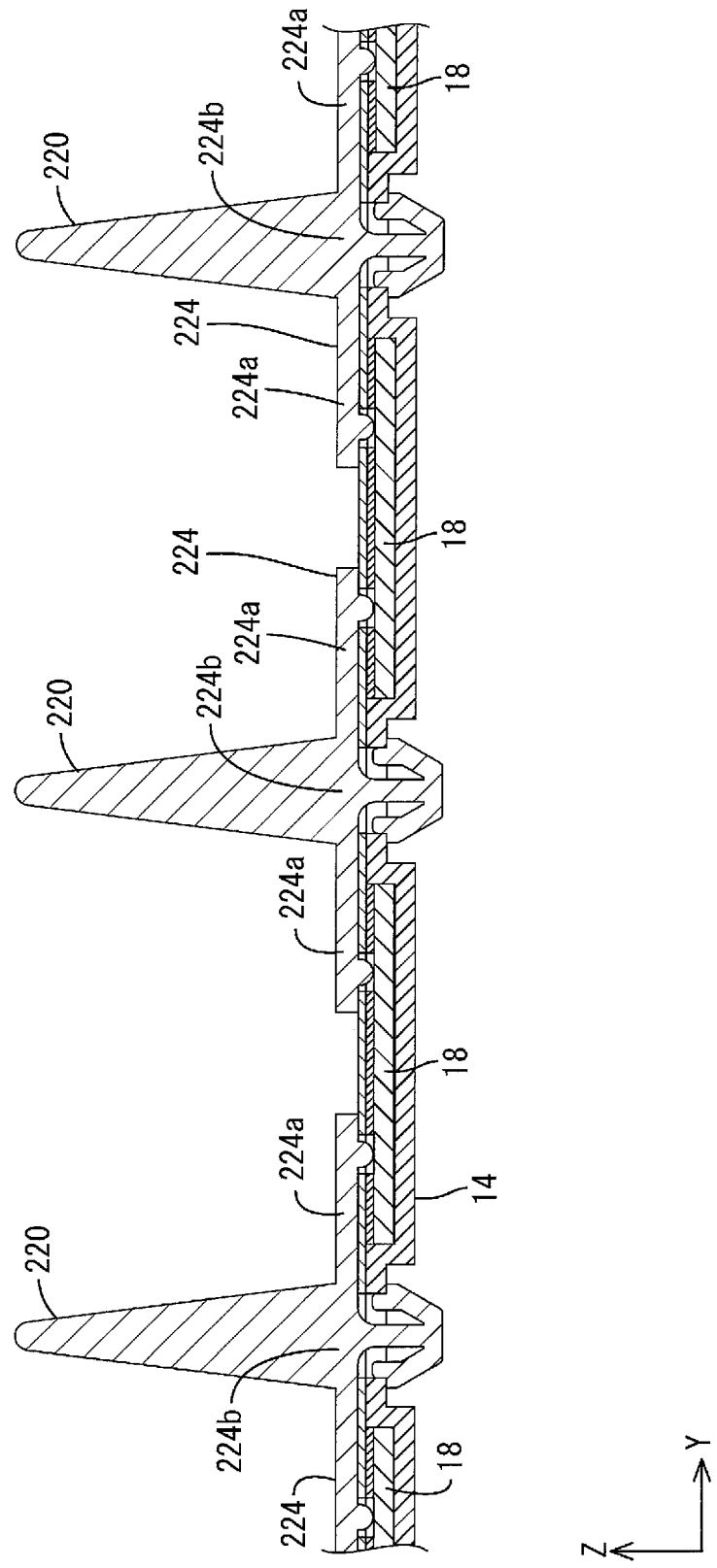
FIG. 22 is a sectional view showing the state where the holding member according to a third embodiment of the present invention is attached to the chassis.

As shown in FIG. 22, the holding member 220 does not cross over the LED board 18. That is, a body portion 224 of the holding member 220 consists of a pair of sandwiching portions 224a that partially overlaps with the LED board 18 in a plan view and a coupling portion 224b that does not overlap with the LED board 18 and couples the both sandwiching portions 224a to each other. The dimension of the sandwiching portions 224a in the Y-axis direction is set to be smaller than the short-side dimension of the LED board 18, and can press an end of the LED board 18 in the Y-axis direction over a predetermined width. The pair of sandwiching portions 224a of the body portion 224 can sandwich the pair of adjacent LED boards 18 in the Y-axis direction between the sandwiching portions 224a and the chassis 14. Both ends of each LED board 18 in the Y-axis direction are held by the pair of adjacent pair of holding member 220 in the Y-axis direction, respectively. Although not shown, the holding members 220 may be arranged in the chassis 14 in a zigzag manner as in the first embodiment.

<Fourth Embodiment>

A fourth embodiment of the present invention will be described with reference to FIG. 23. In the fourth embodiment, a holding member 320 having modified arrangement in the chassis 14 is shown. Overlapping description of the same configuration, functions and effects as those in the first embodiment is omitted.

Figure 23:
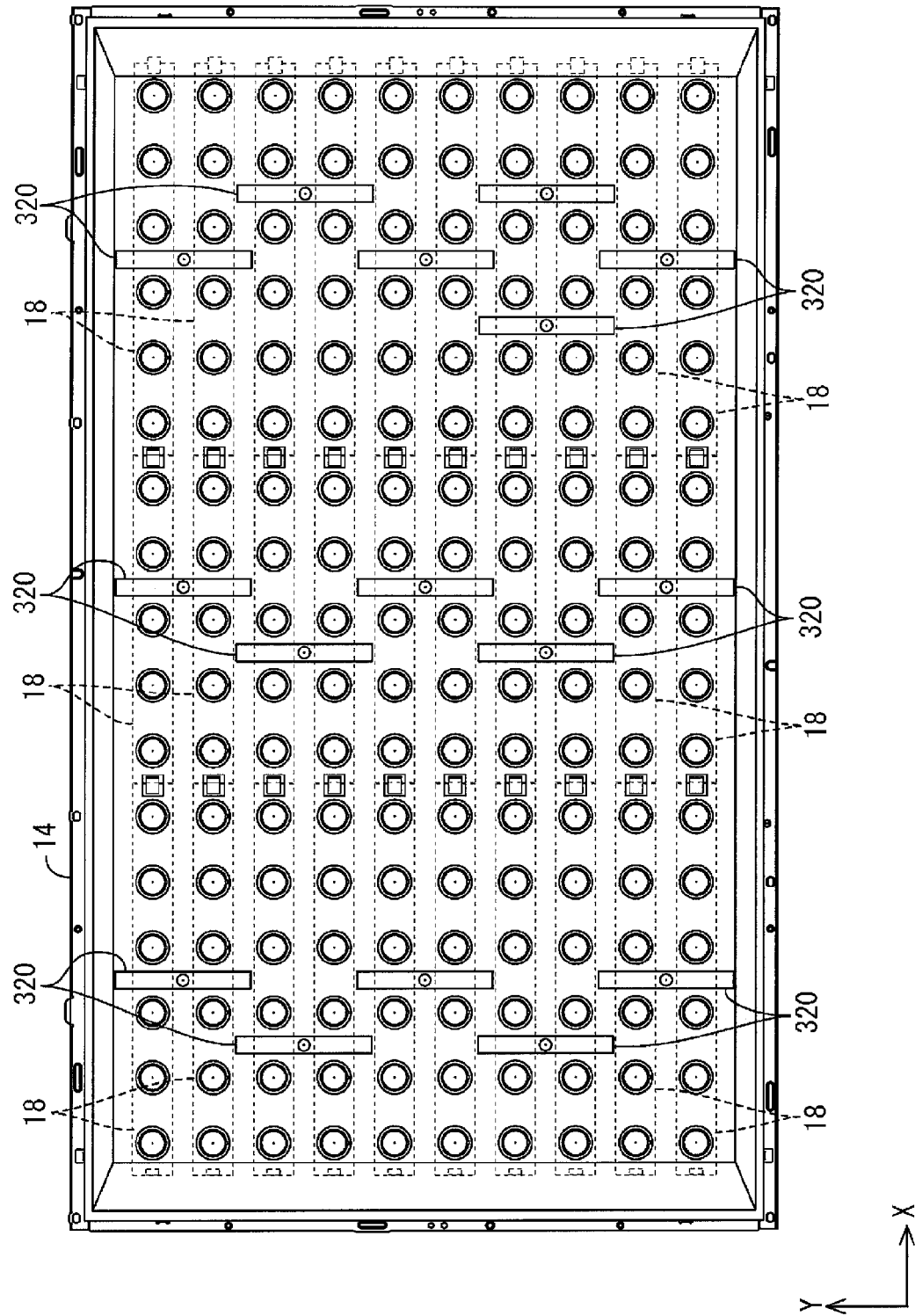
FIG. 23 is a plan view showing detailed arrangement of the LED board and the holding members according to a fourth embodiment of the present invention.

As shown in FIG. 23, the holding members 320 arranged in the chassis 14 in the X-axis direction are disposed substantially at the center of each LED board 18 in the long-side direction. That is, the LED board 18 is fixed to the chassis 14 at one position at the center of the long-side direction by the holding member 320. With this configuration, the number of holding members 320 can be reduced into half from that in the first embodiment, thereby reducing costs and improving working efficiency. In adopting configuration according to this embodiment, it is preferable to provide a positioning structure (not shown) between both ends of the LED board 18 in the long-side direction and the chassis 14 to position the LED board 18 at least in the Y-axis direction.

<Fifth Embodiment>

A fifth embodiment of the present invention will be described below with reference to FIG. 24 or FIG. 25. In the fifth embodiment, the second reflection sheet in the first embodiment is omitted. Overlapping description of the same configuration, actions and effects as those in the first embodiment is omitted.

Figure 24:
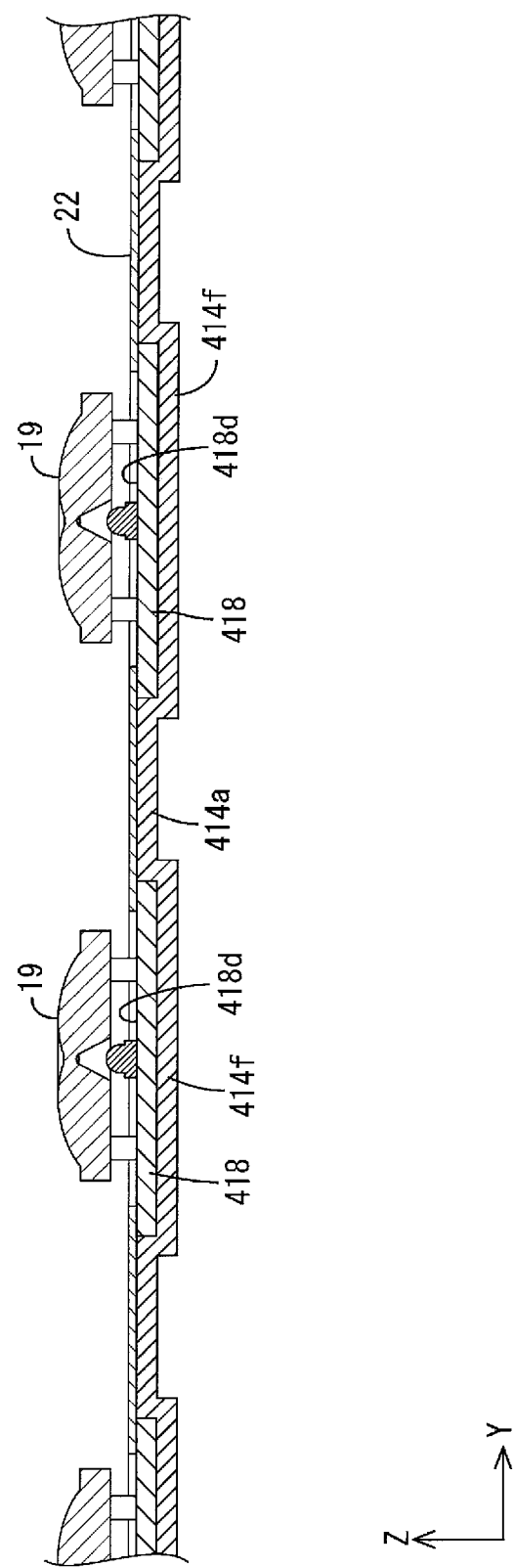
FIG. 24 is a sectional view showing a backlight unit according to a fifth embodiment of the present invention.
Figure 25:
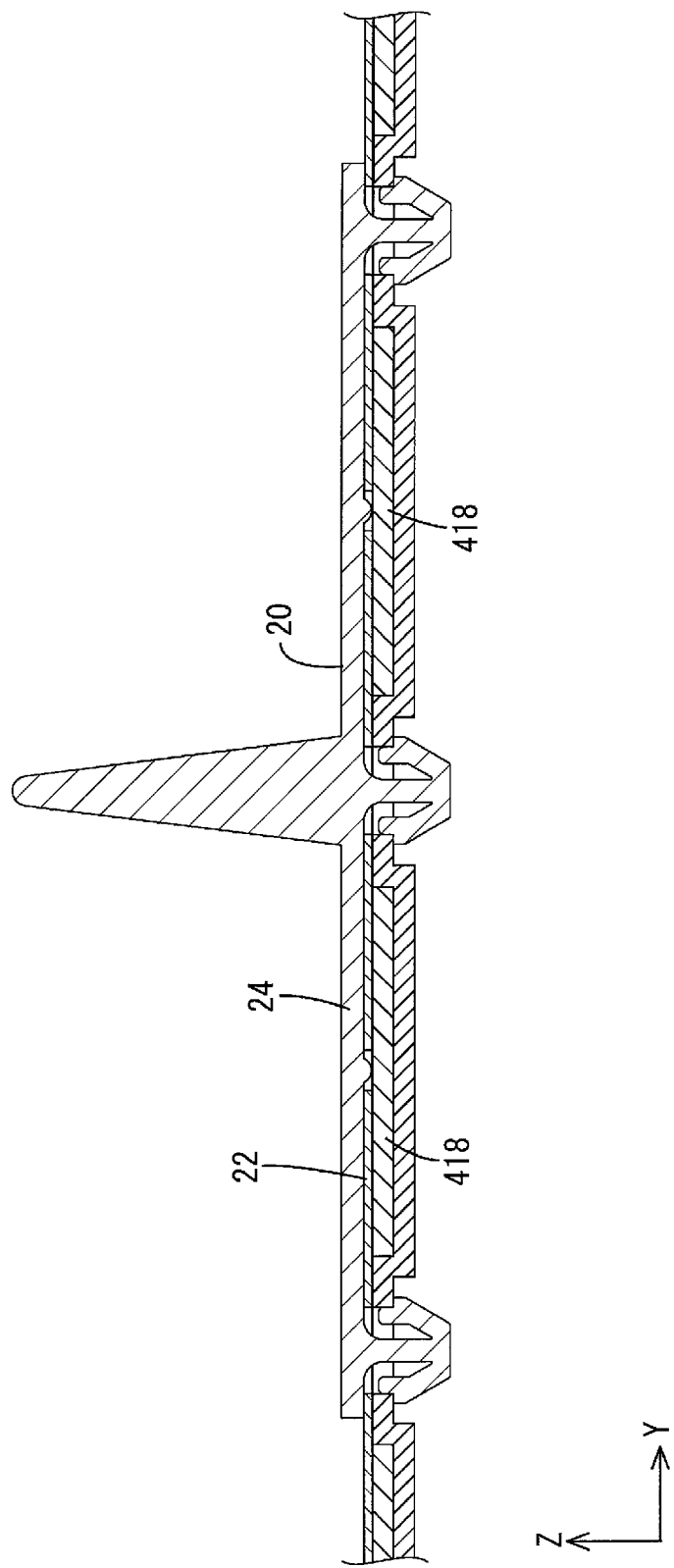
FIG. 25 is a sectional view showing the state where the holding member is attached to the chassis.

In this embodiment, the second reflection sheet 23 according to the first embodiment is omitted, and as shown in FIG. 24, a reflecting layer 418$d$ in place of the second reflection sheet 23 is formed on the front side surface of an LED board 418. The reflecting layer 418$d$ assumes a white color having excellent light reflectivity, and is formed, for example, by printing paste containing a metal oxide on the surface of the LED board 418. Screen printing and ink jet printing are preferable as printing means. Although the reflecting layer 418$d$ can be formed on the almost entire front side surface of the LED board 418, the reflecting layer 418$d$ may be formed on a part opposite to the diffuser lenses 19 on the LED board 418. The reflecting layer 418$d$ can reflect light returned from the diffuser lenses 19 toward the diffuser lenses 19 again. The depth of a board positioning portion 414$f$ positioning the LED board 418 is set to be almost the same as the thickness of the LED board 418 so that the LED board 418 is substantially in flush with a front side surface of a bottom plate 414$a$. As shown in FIG. 25, only the first reflection sheet 22 is sandwiched between the body portion 24 of the holding member 20 and the LED board 418.

<Sixth Embodiment>

A sixth embodiment of the present invention will be described below with reference to FIG. 26. In the sixth embodiment, the diffuser lenses and the second reflection sheet in the first embodiment are omitted. Overlapping description of the same configuration, actions and effects as those in the first embodiment is omitted.

Figure 26:
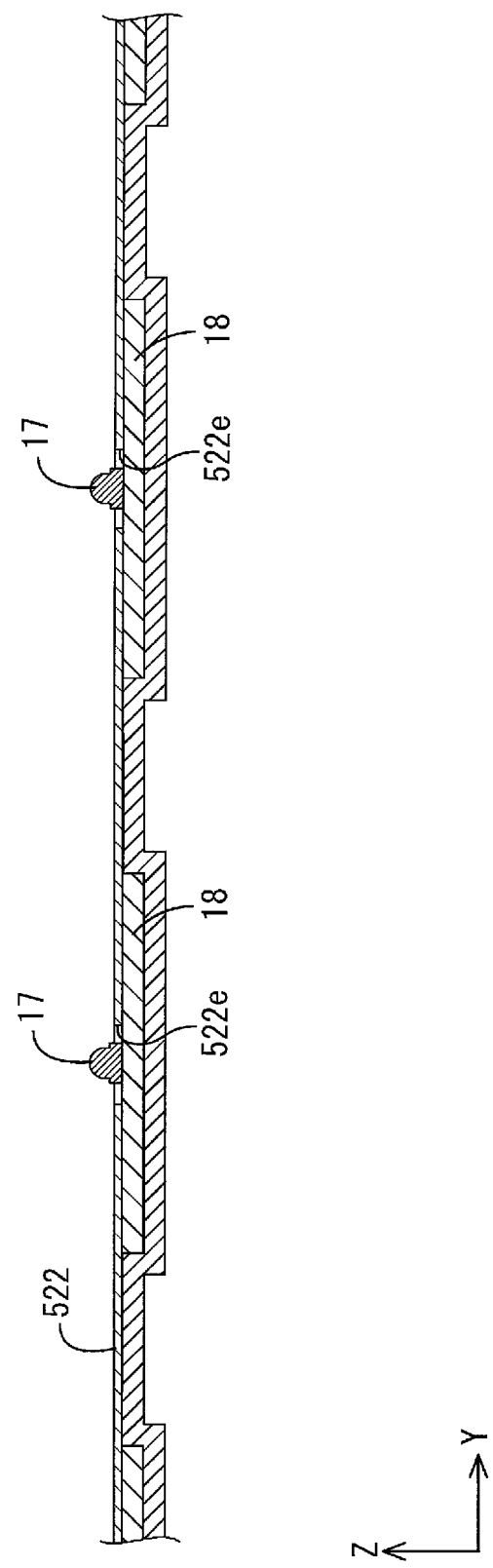
FIG. 26 is a sectional view showing a backlight unit according to a sixth embodiment of the present invention.

In this embodiment, since the diffuser lenses 19 and the second reflection sheet 23 in the first embodiment are omitted, light emitted from each of the LEDs 17, as shown in FIG. 26, directly reaches the optical member 15. A first reflection sheet 522 has an opened LED insertion hole 522$e$ that is capable of passing each of the LEDs 17 therethrough (is smaller than the lens insertion hole 22$b$ in the first embodiment) and can be placed directly on the LED board 18. In adopting this embodiment, since the area between the LEDs 17 is easy to be visually recognized as a dark place, in order to prevent uneven brightness, it is preferred that the alignment pitch of the LEDs 17 in the X-axis direction and the Y-axis direction is smaller than that in the first embodiment.

<Other Embodiments>

The present invention is not limited to the embodiments described in the above description and figures, and for example, following embodiments fall within the technical scope of the present invention.

Figure 27:
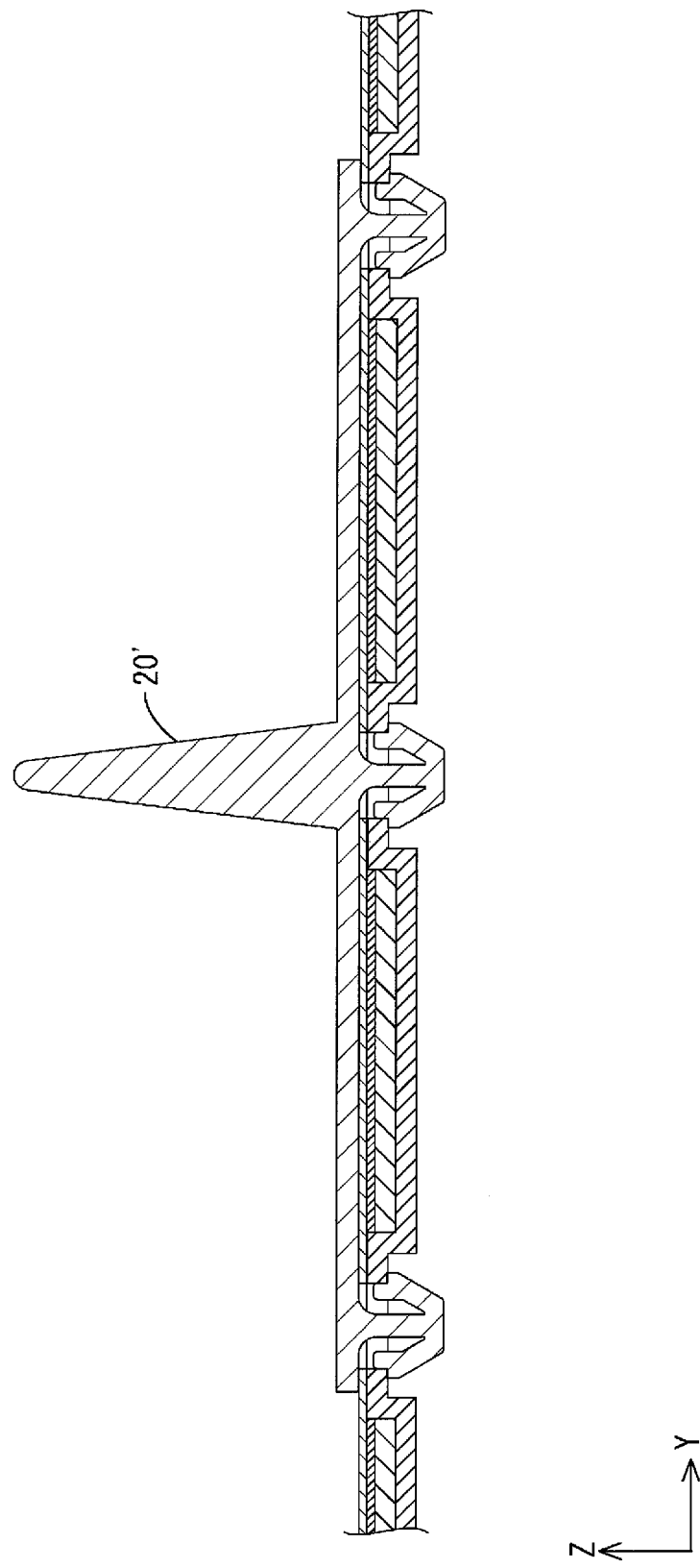
FIG. 27 is a sectional view showing the state where the holding member according to another embodiment (1) of the present invention is attached to the chassis.

(1) Although the holding member includes the board contact portion in each of the above-mentioned embodiments, as shown in FIG. 27, a holding member 20' which does not have a board contact portion also falls within the scope of the present invention.

Figure 28:
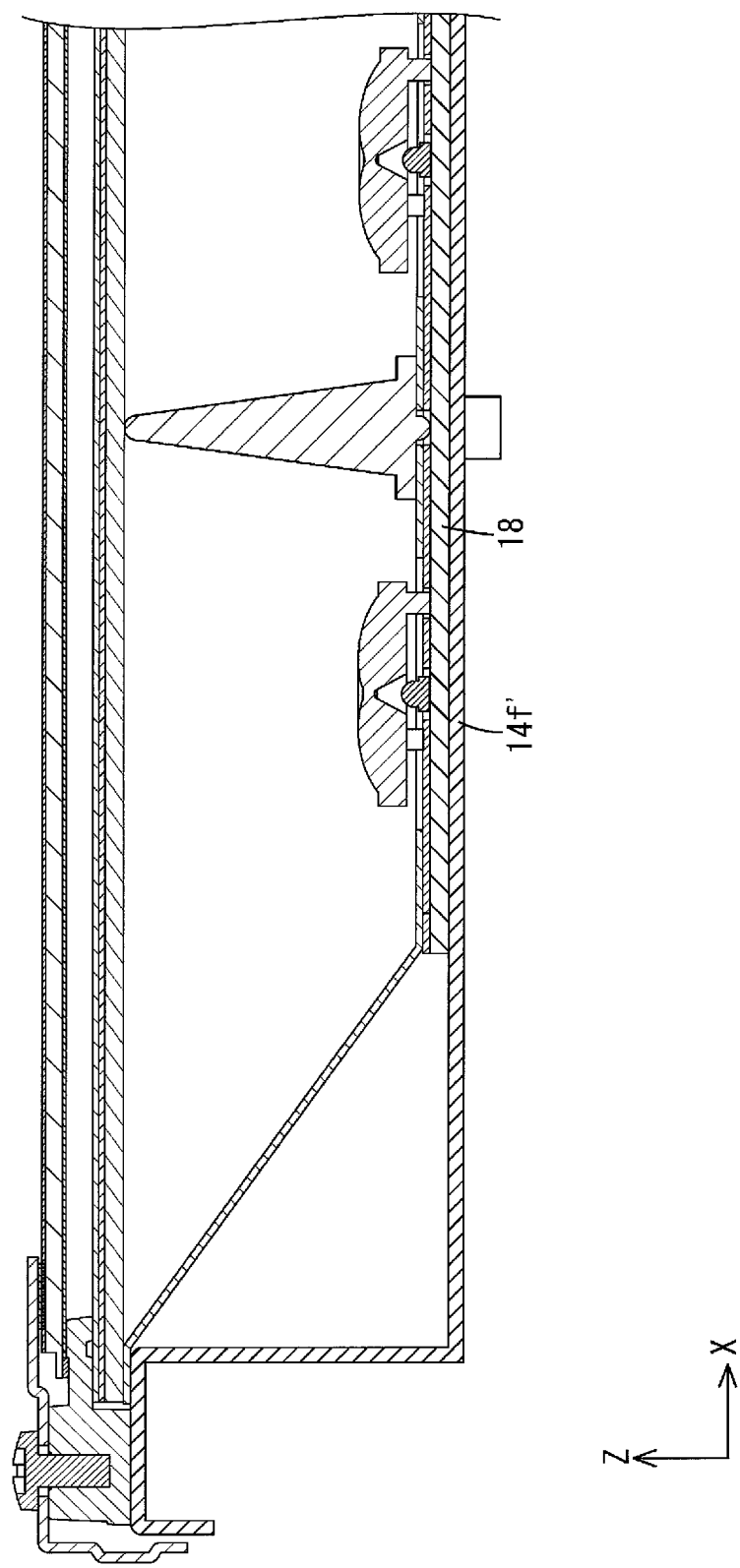
FIG. 28 is a sectional view showing relationship between the chassis and the LED board according to another embodiment (2) of the present invention.

(2) Although the chassis includes the board positioning portion positioning the LED board in the X-axis direction and the Y-axis direction in each of the above-mentioned embodiments, as shown in FIG. 28, a board positioning portion 14$f'$ having no short-side side wall, which positions the LED board 18 only in the Y-axis direction, also falls within the scope of the present invention.

Figure 29:
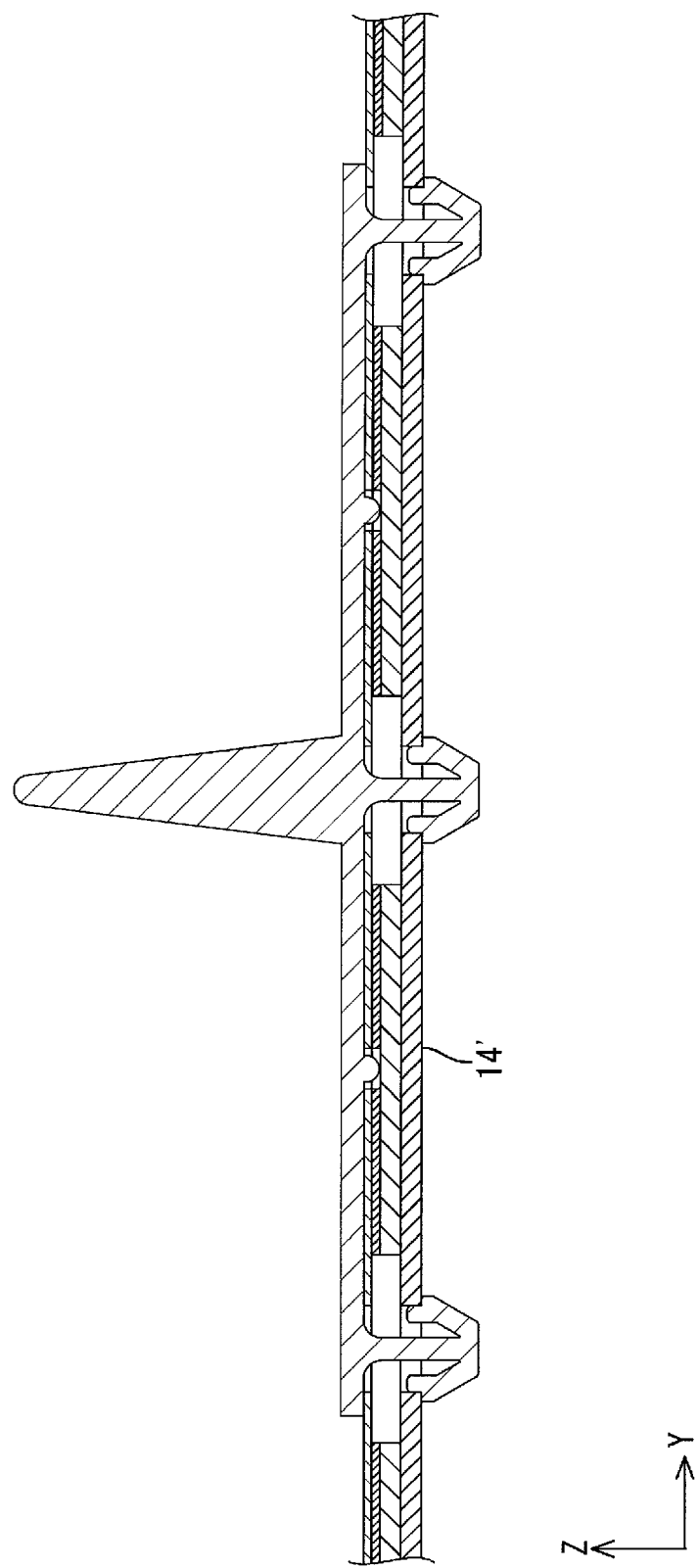
FIG. 29 is a sectional view showing relationship between the chassis and the LED board according to another embodiment (3) of the present invention.

(3) Although the chassis includes the board positioning portion positioning the LED board in the X-axis direction and the Y-axis direction in each of the above-mentioned embodiments, as shown in FIG. 29, a chassis 14' which does not have a board positioning portion also falls within the scope of the present invention.

(4) Although in one holding member holding the plurality of LED boards, the fixed portions are arranged so as to sandwich each LED board therebetween in a plan view in each of the above-mentioned embodiments (except for the second and third embodiments), for example, in the holding member, the fixed portions located at both ends in the Y-axis direction may be left and the fixed portion arranged between the above-mentioned fixed portions (central fixed portion) may be omitted. Even with this configuration, since each LED board is arranged between the pair of fixed portions in a plan view, each LED board can be fixed stably. Alternatively, in the holding member, one or both of the fixed portion located at the ends in the Y-axis direction can be omitted. By reducing the number of fixed portions in this manner, workability in attaching or detaching the holding member to or from the chassis can be improved.

(5) As a matter of course, it is possible to change the protruding dimension of the board contact portion from the body portion in the holding member in the second to sixth embodiments to that in the first modification example of the first embodiment, and to elastically warp the body portion to elastically hold the LED board.

(6) Although for the depth (protruding dimension from the bottom plate) of the board positioning portion, the front side surface of the first reflection sheet, the second reflection sheet or the LED board is substantially in flush with the front side surface of the bottom plate (no step occurs), a slight step may be generated between both the surfaces. In this case, it is possible to set the surface of the bottom plate to be higher or to be lower.

(7) Although the board positioning portion has almost the same dimension as the LED board in a plan view in each of the above-mentioned embodiments, specific dimension can be appropriately changed. For example, the board positioning portion may be smaller than the LED board in a plan view and in this case, one LED board can be positioned with the plurality of board positioning portion. Conversely, the board positioning portion may be larger than the LED board in a plan view, and in this case, the plurality of LED boards can be positioned together by one board positioning portion.

(8) Although the board positioning portion is formed by partially protruding the chassis to the back side in each of the above-mentioned embodiments, a board positioning portion formed by partially protruding the chassis to the front side, that is, the opening also falls within the scope of the present invention. In this case, specific shape of the board positioning portion may be line extending in the X-axis direction or the Y-axis direction, or a point. In forming the point-like board positioning portion, it is preferred that the plurality of point-like board positioning portions are intermittently arranged along the edge of the LED board.

(9) Although the board positioning portion is provided integrally with the chassis in each of the above-mentioned embodiments, a board positioning portion that is formed separately from the chassis and then, is assembled to the chassis also falls within the scope of the present invention.

(10) The shape of the body portion of the holding member in the above-mentioned embodiments can be appropriately changed. Specifically, the body portion shaped like a circle, an ellipse or a square in a plan view also falls within the scope of the present invention. Especially when the holding member does not cross over the plurality of LED boards, but independently fixes the LED boards as in the second embodiment, the degree of freedom in setting the shape of the body portion is high and therefore, the above-mentioned various shapes can be freely selected.

(11) Although the holding member passes between the adjacent LEDs on the LED board in each of the above-mentioned embodiments, the holding member passing an overlapping area with the LED on the LED board in a plan view also falls within the scope of the present invention. In this case, it is preferred that the holding member has an insertion hole in the overlapping area with the LED.

(12) Although the long-side direction of the holding member aligns with the short-side direction of the LED board in each of the above-mentioned embodiments, arrangement in which the long-side direction of the holding member aligns with the long-side direction of the LED board also falls within the scope of the present invention. In this case, the shape of the holding member may be appropriately changed according to the configuration of the LED board, and specifically, it is preferable to form a thorough hole in an overlapping area with that LED (diffuser lens).

(13) Although one holding member fixes one or two LED boards together to the chassis in each of the above-mentioned embodiments, one holding member fixing three or more LED boards together to the chassis also falls within the scope of the present invention.

(14) Although one LED board is fixed at one or two positions by the holding member in each of the above-mentioned embodiments, the LED board fixed at three or more positions by the holding members also falls within the scope of the present invention.

(15) The number and arrangement of the holding members to be arranged to the chassis in each of the above-mentioned embodiments can be appropriately changed.

(16) Although the plug-in type fixed portion is adopted as an attachment structure of the holding member to the chassis in each of the above-mentioned embodiments, a slide-type fixed portion may be adopted as the attachment structure. In such slide-type attachment structure, by adopting a hook-type fixed portion, pushing the body portion toward the bottom plate of the chassis and then, sliding the body portion along the bottom plate, the hooked part of the fixed portion is engaged with the edge of the attachment hole.

(17) Although the fixed portion of the holding member is engaged with the chassis through the insertion hole in each of the above-mentioned embodiments, the specific method of fixing the fixed portion to the chassis can be appropriately changed. For example, the configuration in which the attachment hole and the elastic engaged portion are omitted and a bottom part passing through the through hole of the LED board is fixedly attached to the inner wall surface of the chassis with the adhesive or the like falls within the scope of the present invention. In this case, means such as deposition and welding other than the adhesive can be adopted.

(18) Although the supporting portion is in contact with the diffuser plate extending straight in the X-axis direction and the Y-axis direction in each of the above-mentioned embodiments, the configuration in which the supporting portion that is not in contact with the straight diffuser plate (specifically, the protruding front end of the supporting portion is located closer to the LED than the surface of the diffuser plate on the LED side) falls within the scope of the present invention. With this configuration, for example, even when the diffuser plate thermally expands due to change in the thermal environment in the backlight unit, the diffuser plate is allowed to be deformed so as to warp toward the LED in a clearance held between the diffuser plate and the supporting portion. Thereby, wrinkle or flexure is hard to occur in the diffuser plate and thus, uneven brightness is also hard to occur in illumination light emitted from the diffuser plate.

(19) Although the supporting portion is conical in each of the above-mentioned embodiments, for example, the pyramid-like supporting portion also falls within the scope of the present invention. The supporting portion is not necessarily tapered, and the cylindrical or prismatic supporting portion having uniform diameter also falls within the scope of the present invention.

(20) Although the supporting portion is arranged substantially at the center of the body portion in the long-side direction in each of the above-mentioned embodiments, this arrangement can be appropriately changed. Specifically, the supporting portion can be eccentrically arranged at the end of the body portion in the long-side direction.

(21) Although the supporting portion is point in the plane of the optical member in each of the above-mentioned embodiments, a linear or sheet-like supporting portion in the plane of the optical member also falls within the scope of the present invention.

(22) Although the holding member is provided with the supporting portion in each of the above-mentioned embodiments, the supporting portion may be omitted from the holding member. That is, the holding member having only the function of fixing the LED board and having no function of supporting the optical member also falls within the scope of the present invention.

(23) Although the color of the surface of the holding member is white in each of the above-mentioned embodiments, the color of the surface of the holding member may be creamy white or silver. Color of the surface can be set by applying paint of a desired color on the surface of the holding member.

(24) Although the five-mounted type, the six-mounted type and the eight-mounted type of LED boards are combined as appropriate in each of the above-mentioned embodiments, an LED board that mounts the number of LEDs other than five, six and eight LEDs falls within the scope of the present invention.

(25) Although the LED that includes the LED chip that emits only blue light and emits white light by means of the phosphor is used in each of the above-mentioned embodiments, an LED that includes the LED chip that emits only ultraviolet light and emits white light by means of the phosphor falls within the scope of the present invention.

(26) Although the LED that includes the LED chip that emits only blue light and emits white light by means of the phosphor is used in each of the above-mentioned embodiments, an LED that has three types of LED chips that emit R, G, B, respectively, falls within the scope of the present invention. Moreover, an LED that has three types of LED chips that emit C (cyan), M (magenta), Y (yellow), respectively, also falls within the scope of the present invention.

(27) Although the LED that emits white light in each of the above-mentioned embodiments, an LED that emits red light, an LED that emits blue light and an LED that emits green light may be combined as appropriate.

(28) Although the LED is used as the light source in each of the above-mentioned embodiments, a point light source other than the LED also falls within the scope of the present invention. A planar light source such as an organic EL may be adopted.

(29) Although the diffuser lens that diffuses light from the LED is used in the first to fifth embodiments, an optical lens other than the diffuser lens (for example, a collective lens) falls within the scope of the present invention.

(30) Also in embodiments other than each of the above-mentioned embodiments, screen size and aspect ratio of the liquid crystal display device can be changed as appropriate.

(31) Although the liquid crystal panel and the chassis are arranged in the longitudinally mounted state so that the short-side direction aligns with the vertical direction in each of the above-mentioned embodiments, the configuration in which the liquid crystal panel and the chassis are arranged in the longitudinally mounted state so that the long-side direction aligns with the vertical direction also falls within the scope of the present invention.

(32) Although the TFT is used as the switching component of the liquid crystal display device in each of the above-mentioned embodiments, the present invention can also be applied to a liquid crystal display device using a switching component (for example, a thin film diode (TFD)) other than TFT and the monochrome liquid crystal display device other than the color liquid crystal display device.

(33) Although the liquid crystal display device using the liquid crystal panel as the display panel is illustrated in each of the above-mentioned embodiments, the present invention can be applied to a display device using the other type of display panel.

(34) Although the television receiver provided with a tuner is illustrated in each of the above-mentioned embodiments, the present invention can be applied to a display device having no tuner.

The invention claimed is:

1. A lighting device comprising:
a light source board including a light source;
a chassis storing the light source board therein and having an opening through which light from the light source exits; and
a holding member extending in at least one direction along a plate surface of the light source board and fixed to the chassis so as to hold the light source board together with the chassis between the holding member and the chassis; wherein
the chassis includes a board positioning portion configured to position the light source board in a direction along the plate surface;
the board positioning portion extends along an edge of the light source board; and
the board positioning portion has a board storing space in which the light source board is inserted from the opening side and stored, the board positioning portion being formed by protruding a part of the chassis to the side opposite to the opening.

2. The lighting device according to claim 1, wherein the holding member includes a body portion holding the light source board together with the chassis between the body portion and the chassis, and a fixed portion protruding from the body portion toward the chassis and fixed to the chassis.

3. The lighting device according to claim 2, wherein the fixed portion is arranged in an area of the body portion where the light source board does not overlap in a plan view.

4. The lighting device according to claim 3, wherein:
the body portion crosses over the light source board; and
the fixed portion includes a pair of fixed portions arranged on respective sides of the light source board in a plan view.

5. The lighting device according to claim 3, wherein the body portion has a board contact portion in an area overlapping the light source board in a plan view, the board contact portion protruding toward the light source board and being in direct or indirect contact with the light source board.

6. The lighting device according to claim 5, further comprising a reflection member arranged between the body portion and the light source board inside the chassis, the reflection member being configured to reflect light toward the opening and having a light source insertion hole and a board contact portion insertion hole, the light source insertion hole being formed in an area overlapping the light source in a plan view and through which the light source is passed, the board contact portion insertion hole being formed in an area overlapping the board contact portion in a plan view and through which the board contact portion is passed.

7. The lighting device according to claim 6, wherein a dimension of the board contact portion protruding from the body portion is larger than a thickness of the reflection member.

8. The lighting device according to claim 2, wherein:
the light source board is rectangular in a plan view; and
the body portion extends in the short-side direction of the light source board.

9. The lighting device according to claim 8, wherein the body portion crosses over the light source board.

10. The lighting device according to claim 8, wherein:
the light source board includes a plurality of light source boards arranged parallel to one another; and
the body portion extends over the plurality of light source boards.

11. The lighting device according to claim 10, wherein the body portion crosses over the light source boards.

12. The lighting device according to claim 8, wherein the light source includes a plurality of light sources arranged parallel to one another on the light source board along a long-side direction of the light source board.

13. The lighting device according to claim 12, wherein the body portion is arranged between the adjacent light sources.

14. The lighting device according to claim 8, wherein the holding member includes two holding members which are arranged at two positions separated from each other in the long-side direction of the light source board.

15. The lighting device according to claim 10, wherein:
the chassis is rectangular in a plan view; and
the light source boards are arranged parallel to one another with the long-side direction aligned with a long-side direction of the chassis.

16. The lighting device according to claim 2, wherein the fixed portion is passed through the chassis and is engaged with the chassis on a side opposite to the light source board.

17. The lighting device according to claim 2, further comprising an optical member arranged so as to cover the opening and to face the light source board, wherein the body portion has a supporting portion that protrudes toward the optical member and supports the optical member.

18. The lighting device according to claim 17, wherein the fixed portion and the supporting portion are arranged so as to overlap each other in a plan view.

19. The lighting device according to claim 18, wherein the fixed portion and the supporting portion are arranged concentrically with each other.

20. The lighting device according to claim 2, further comprising a reflection member configured to reflect light toward the opening, having a light source insertion hole in an area overlapping the light source in a plan view and through which the light source is passed, having a plan-view area larger than the board positioning portion, and arranged between the body portion and the light source board.

21. The lighting device according to claim 20, wherein a dimension of the board positioning portion protruding from the chassis to the side opposite to the opening is about equal to the thickness of the light source board.

22. The lighting device according to claim 1, wherein:
the light source board is rectangular in a plan view; and
the board positioning portion extends in the long-side direction of the light source board.

23. The lighting device according to claim 1, wherein
the board positioning portion is configured to position the light source board in two directions that are along the plate surface and are perpendicular to each other.

24. A lighting device, comprising:
a light source board including a light source;
a chassis storing the light source board therein and having an opening through which light from the light source exits;
a holding member extending in at least one direction along a plate surface of the light source board and fixed to the chassis so as to hold the light source board together with the chassis between the holding member and the chassis;
a reflection member configured to reflect light toward the opening, arranged closer to the opening than the light source board, and having a light source insertion hole in an area overlapping the light source in a plan view and through which the light source is passed; and
a diffuser lens configured to diffuse light from the light source, the diffuser lens being arranged on the light source board in an area overlapping the light source in a plan view on the opening side;
wherein the reflection member includes a first reflection member and a second reflection member, the first reflection member having the light source insertion hole through which the diffuser lens is passed, the second reflection member being configured to reflect light toward the diffuser lens and arranged in an area overlapping the light source insertion hole of the first reflection member in a plan view between the light source board and the diffuser lens.

25. The lighting device according to claim 24, wherein the edge of the light source insertion hole of the first reflection member and the second reflection member overlap each other in a plan view.

26. The lighting device according to claim 25, wherein the first reflection member and the second reflection member are sandwiched between the holding member and the light source board.

27. The lighting device according to claim 1, wherein the light source is an LED.

28. A display device comprising:
the lighting device according to claim 1; and
a display panel configured to provide display using light from the lighting device.

29. The display device according to claim 28, wherein the display panel is a liquid crystal panel including liquid crystals between a pair of substrates.

30. A television receiver comprising the display device according to claim 28.

31. The lighting device according to claim 24, wherein the light source is an LED.

32. A display device comprising:
the lighting device according to claim 24; and
a display panel configured to provide display using light from the lighting device.

33. The display device according to claim 32, wherein the display panel is a liquid crystal panel including liquid crystals between a pair of substrates.

34. A television receiver comprising the display device according to claim 32.

* * * * *